(12) United States Patent
Sayers et al.

(10) Patent No.: US 10,444,389 B2
(45) Date of Patent: Oct. 15, 2019

(54) DETERMINING CHANGE IN PERMEABILITY CAUSED BY A HYDRAULIC FRACTURE IN RESERVOIRS

(71) Applicant: Schlumberger Technology Corporation, Sugar Land, TX (US)

(72) Inventors: Colin M. Sayers, Katy, TX (US); Lennert D. Den Boer, Alberta (CA)

(73) Assignee: Schlumberger Technology Corporation, Sugar Land, TX (US)

( * ) Notice: Subject to any disclaimer, the term of this patent is extended or adjusted under 35 U.S.C. 154(b) by 392 days.

(21) Appl. No.: 14/900,365

(22) PCT Filed: Jun. 19, 2014

(86) PCT No.: PCT/US2014/043085
§ 371 (c)(1),
(2) Date: Dec. 21, 2015

(87) PCT Pub. No.: WO2014/205162
PCT Pub. Date: Dec. 24, 2014

(65) Prior Publication Data
US 2016/0154129 A1   Jun. 2, 2016

Related U.S. Application Data

(60) Provisional application No. 61/837,705, filed on Jun. 21, 2013.

(51) Int. Cl.
*G01V 1/28* (2006.01)
*G01V 1/30* (2006.01)
(Continued)

(52) U.S. Cl.
CPC ............. *G01V 1/306* (2013.01); *E21B 43/26* (2013.01); *E21B 47/10* (2013.01); *G01V 1/282* (2013.01);
(Continued)

(58) Field of Classification Search
CPC .......... G01V 1/306; G01V 1/282; G01V 1/30; G01V 2210/1234; G01V 1/288;
(Continued)

(56) References Cited

U.S. PATENT DOCUMENTS

| 7,869,954 B2 | 1/2011 | den Boer et al. |
| 2009/0125240 A1 | 5/2009 | Den Boer et al. |

(Continued)

FOREIGN PATENT DOCUMENTS

WO    2012125558 A2    9/2012

OTHER PUBLICATIONS

Sayers et al "Microcrack-induced elastic wave anisotropy of brittle rocks", 1995, Journal of Geophysical Research, vol. 100, 4149-4156.*

(Continued)

*Primary Examiner* — Patricia D Reddington
(74) *Attorney, Agent, or Firm* — Mitchell M. Blakely

(57) ABSTRACT

A method can include deriving a cloud of microseismic events corresponding to a fracturing operation in an environment by spatially locating the microseismic events in the environment via a seismic velocity model; extracting a set of fracture planes from the microseismic cloud; assigning characteristics to the fracture planes; determining a second-rank fracture compliance tensor and a fourth-rank fracture compliance tensor based on the characteristics of the fracture planes; determining a change in elastic stiffness of the environment using the second-rank fracture compliance tensor and the fourth-rank compliance tensor; and updating the seismic velocity model based at least in part on the change in the elastic stiffness of the environment or determining permeability in the environment based at least in part (Continued)

on fracture plane locations, orientations and apertures. Various other apparatuses, systems, methods, etc., are also disclosed.

19 Claims, 17 Drawing Sheets

(51) Int. Cl.
*E21B 43/26* (2006.01)
*E21B 47/10* (2012.01)
*E21B 47/00* (2012.01)
*E21B 49/00* (2006.01)

(52) U.S. Cl.
CPC .............. *G01V 1/30* (2013.01); *E21B 47/00* (2013.01); *E21B 49/00* (2013.01); *G01V 2210/1234* (2013.01)

(58) Field of Classification Search
CPC . G01V 2210/6161; E21B 43/26; E21B 47/10; E21B 47/00
USPC .......................................................... 702/13
See application file for complete search history.

(56) References Cited

U.S. PATENT DOCUMENTS

| | | |
|---|---|---|
| 2011/0029291 A1 | 2/2011 | Weng et al. |
| 2011/0087472 A1 | 4/2011 | den Boer et al. |
| 2013/0081805 A1* | 4/2013 | Bradford .................. G01V 1/40 166/250.1 |
| 2013/0144532 A1 | 6/2013 | Williams et al. |
| 2017/0075007 A1* | 3/2017 | Walters .................. G01V 1/306 |

OTHER PUBLICATIONS

PCT/US2014/043085 International Search Report and Written Opinion dated Oct. 15, 2014, 10 pgs.
Fisher, et al., "Integrating Fracture Mapping Technologies to Optimize Stimulations in The Barnett Shale," SPE Annual Technical Conference and Exhibition held in San Antonio, TX, Sep. 29-Oct. 2, 2002.
Fisher, et al., "Optimizing Horizontal Completion Techniques in the Barnett Shale Using Microseismic Fracture Mapping," SPE Annual Technical Conference and Exhibition held in Houston, TX USA, Sep. 26-29, 2004.
Kachanov, "Continuum Model of Medium with Cracks," J. Engng. Mech. Div. ASCE, 106, pp. 1039-1051, 1980.
Le Calvez, et al., "Using Induced Microseismicity to Monitor Hydraulic Fracture Treatment: A Tool to Improve Completion Techniques and Reservoir Management," SPE Eastern Regional Meeting held in Canton, Ohio, USA, Oct. 11-13, 2006.
Maxwell, et al., "Microseismic Imaging of Hydraulic Fracture Complexity in the Barnett Shale," SPE Annual Technical Conference and Exhibition held in San Antonio, TX, Sep. 29-Oct. 2, 2002.
Potapenko, et al., "Barnett Shale Re-Fracture Stimulations Using a Novel Diversion Technique," SPE Hydraulic Fracturing Technology Conference held in the Woodlands, TX, USA, Jan. 19-21, 2009.
Rich, et al., "Unconventional Geophysics for Unconventional Plays," SPE Unconventional Gas Conference held in Pittsburgh, Pennsylvania, USA, Feb. 23-25, 2010.
Schoenberg, "Time-Dependent Anisotropy Induced by Pore Pressure Variation in Fractured Rock," Journal of Seismic Exploration, 11 (1-2), pp. 83-105, 2002.
Schoenberg, et al., "Zoeppritz' Rationalized and Generalized to Anisotropy," Journal of Seismic Exploration, 1, 125-144, 1992.
Warpinski, et al., "Comparison of single-and dualarray microseismic mapping techniques in the Barnett Shale," SPE Annual Technical Conference and Exhibition held in Dallas, TX, USA, Oct. 9-12, 2005.
Worthington, "The compliance of macrofractures," The Leading Edge, Sep. 2007, vol. 26, pp. 1118-1122.

* cited by examiner

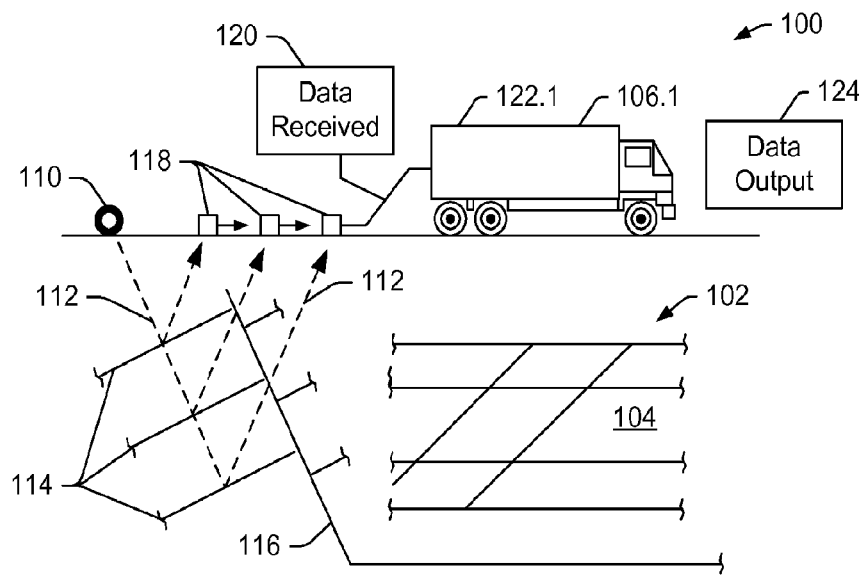
Fig. 1.1
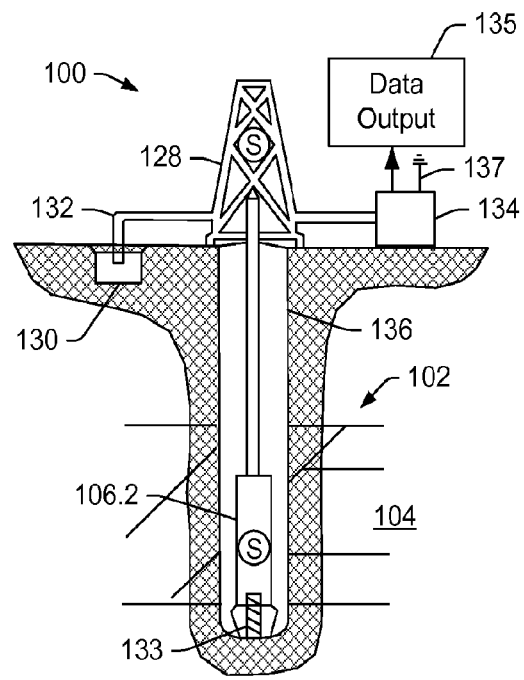
Fig. 1.2

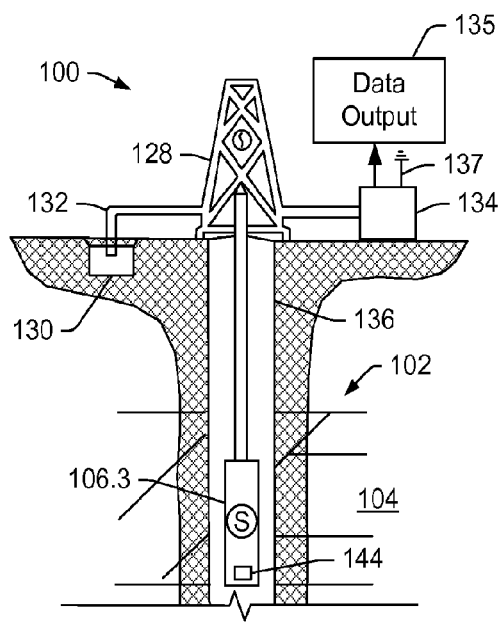
Fig. 1.3
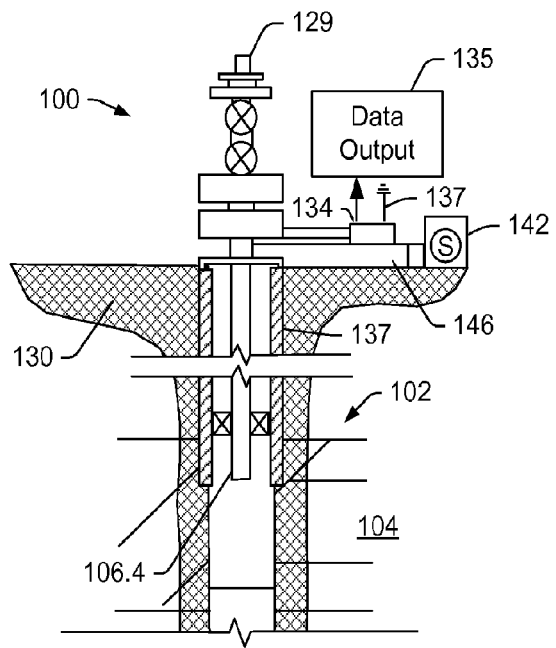
Fig. 1.4

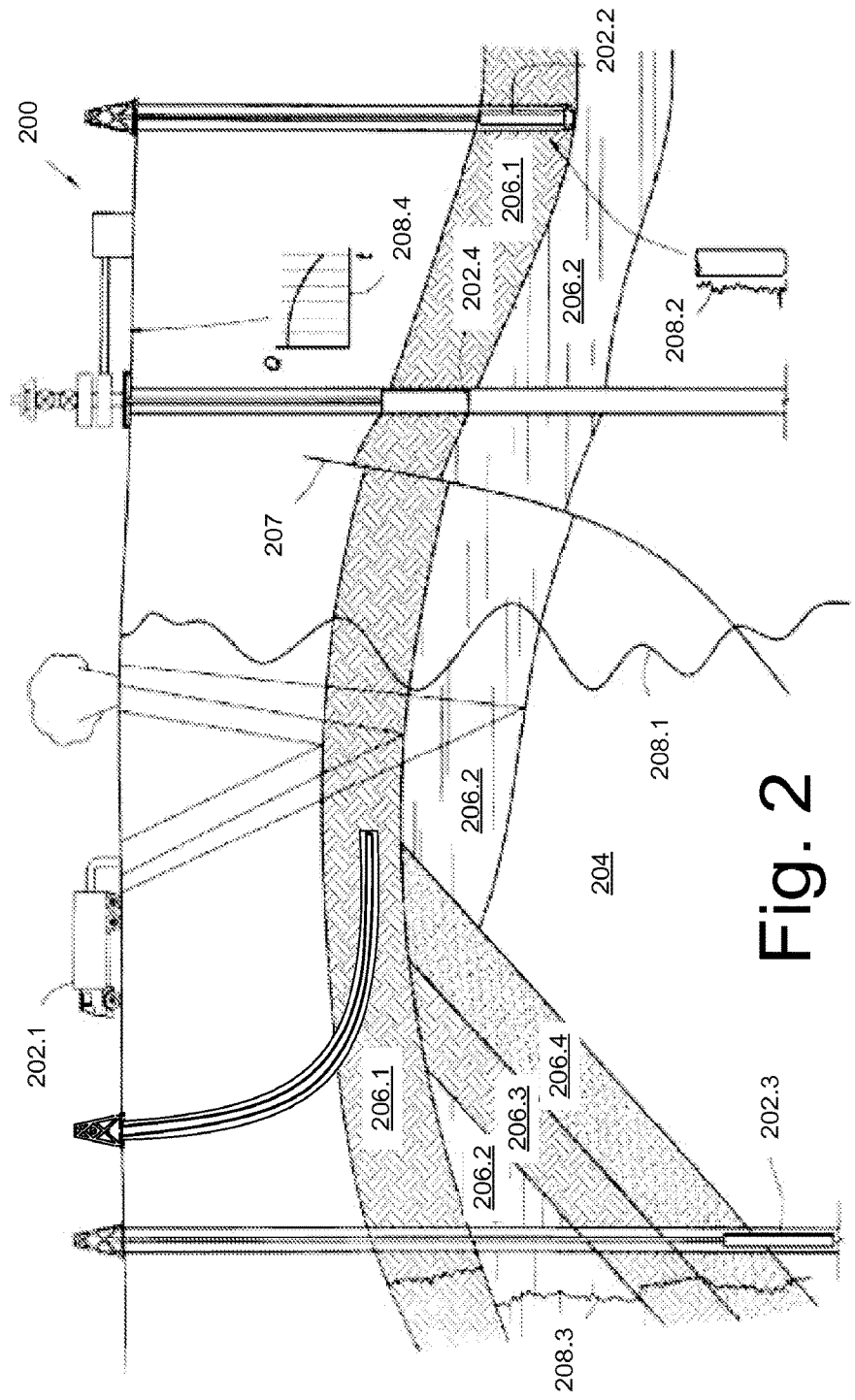

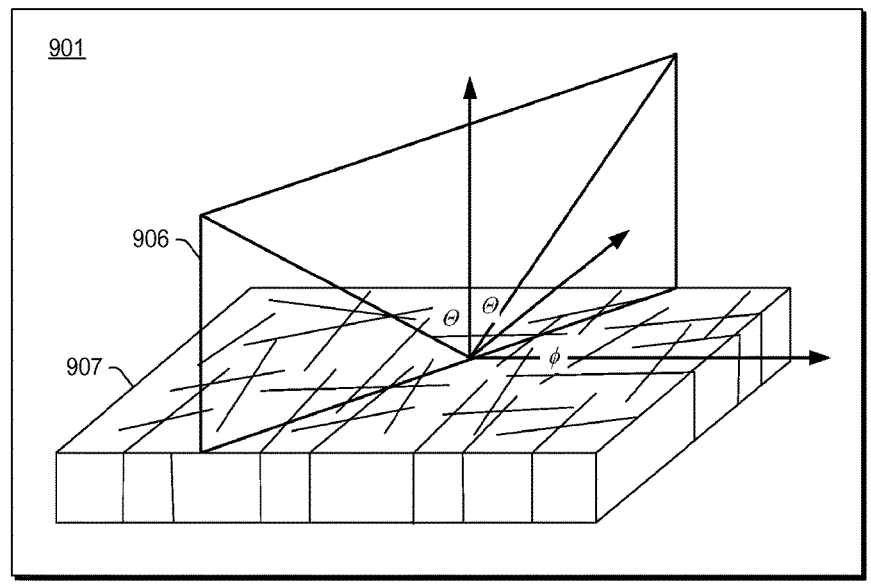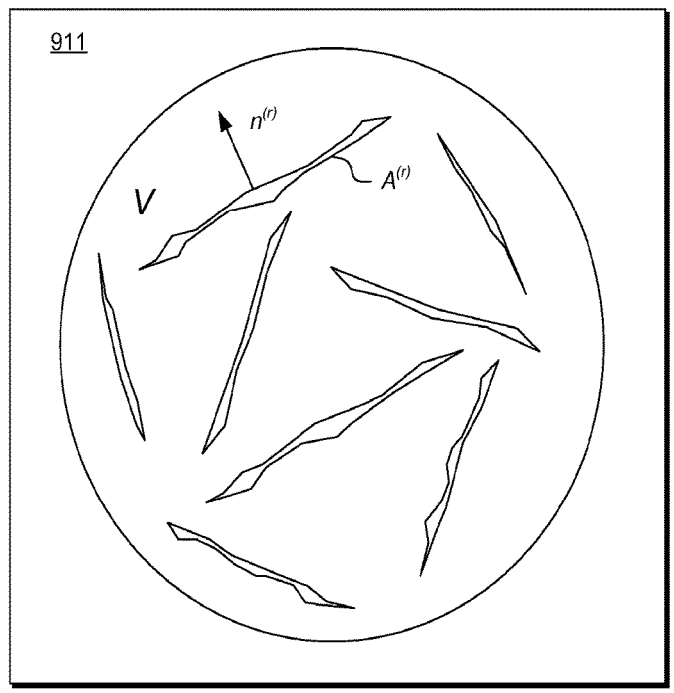
Fig. 9

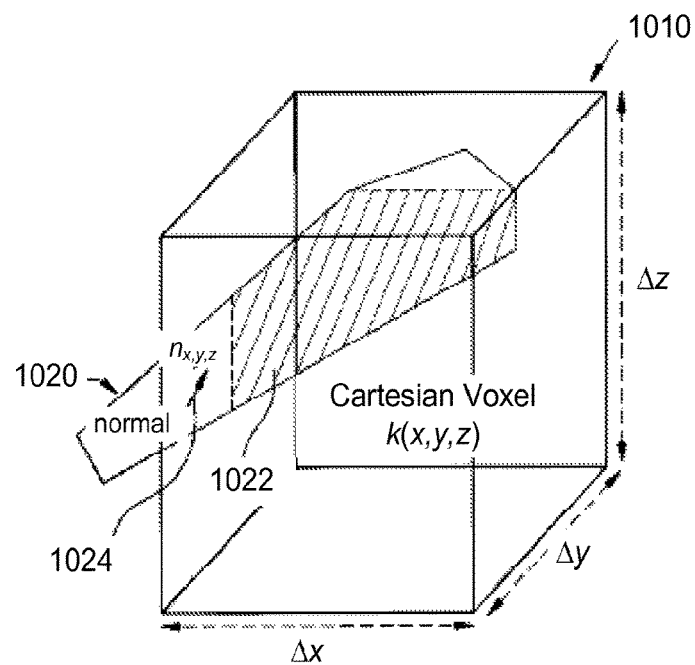
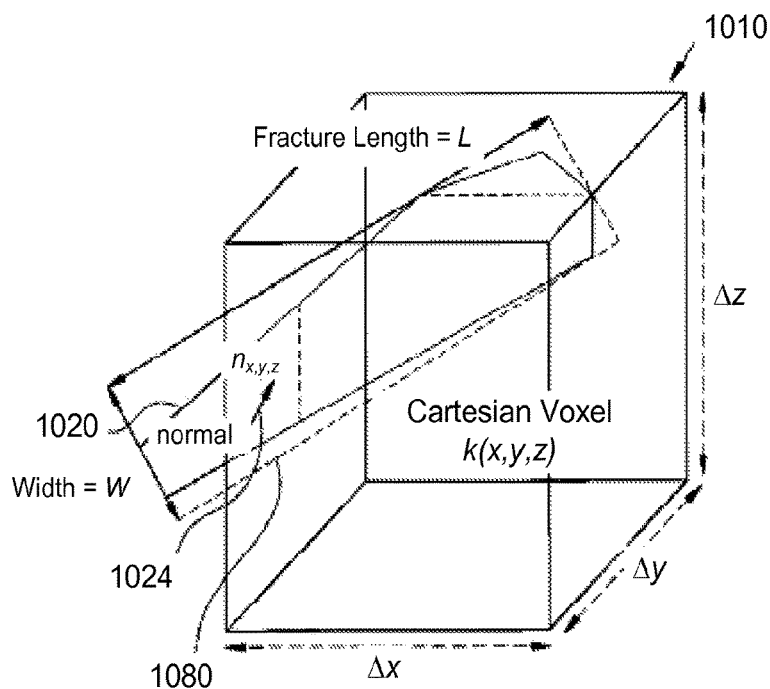
Fig. 10

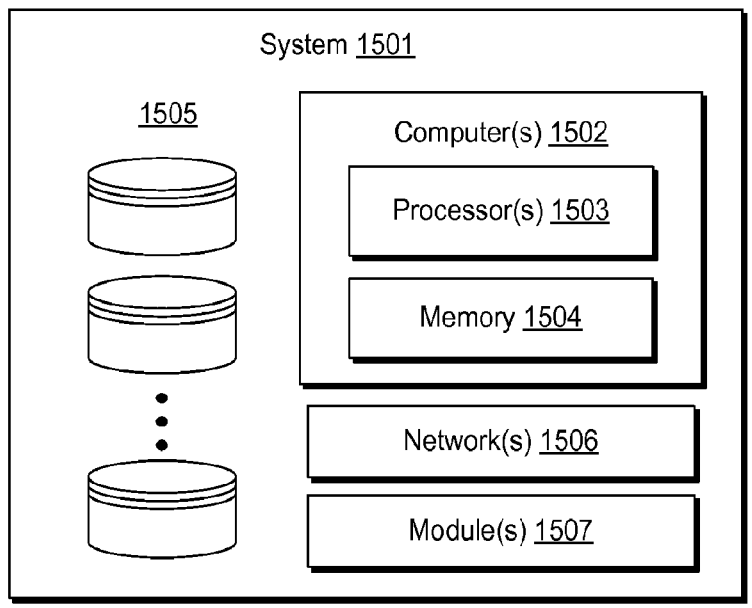
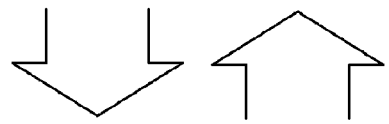
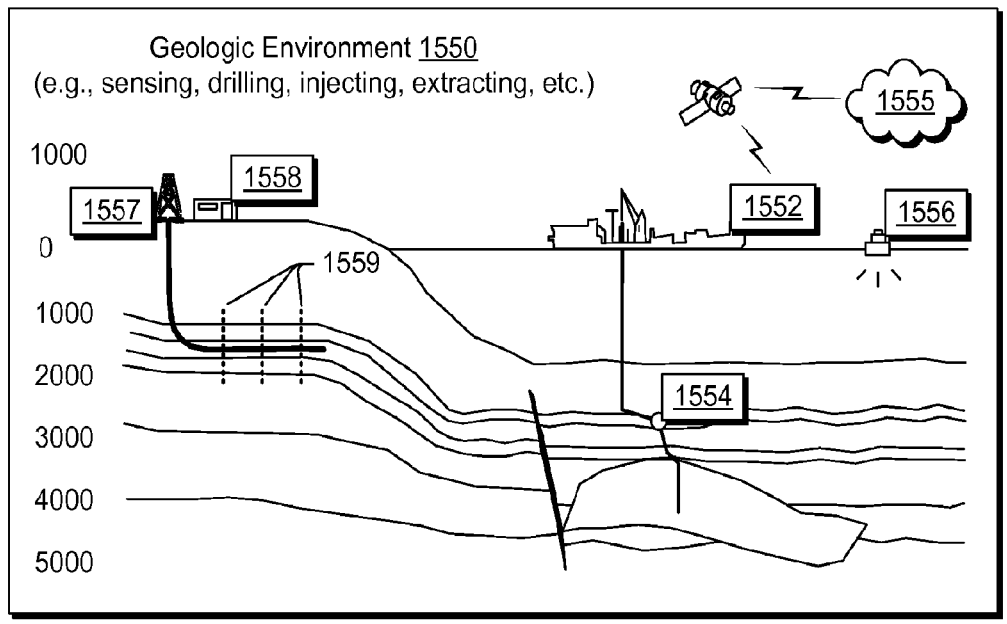
Fig. 15

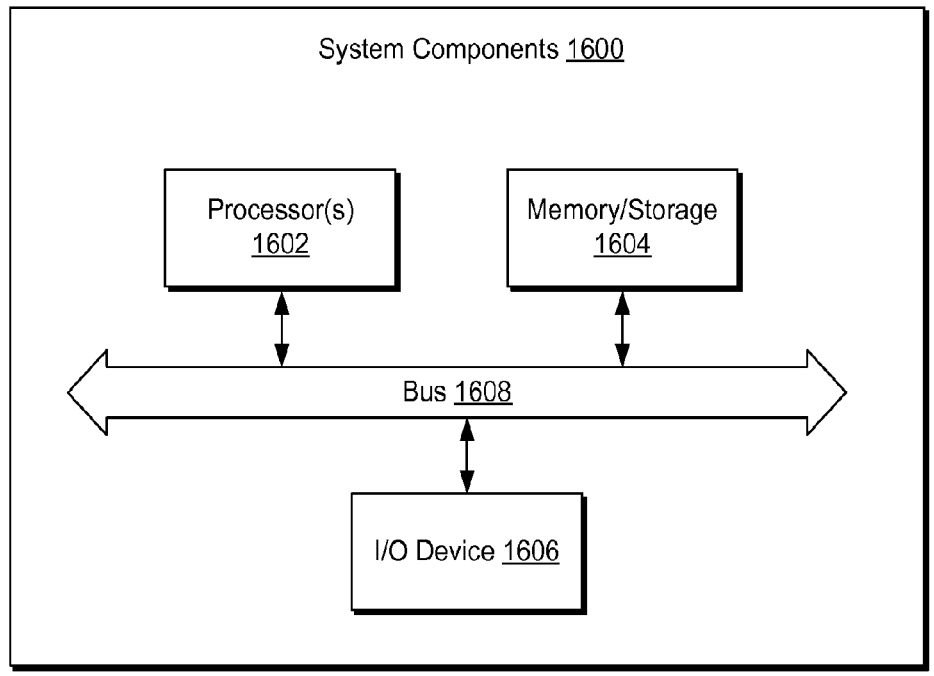
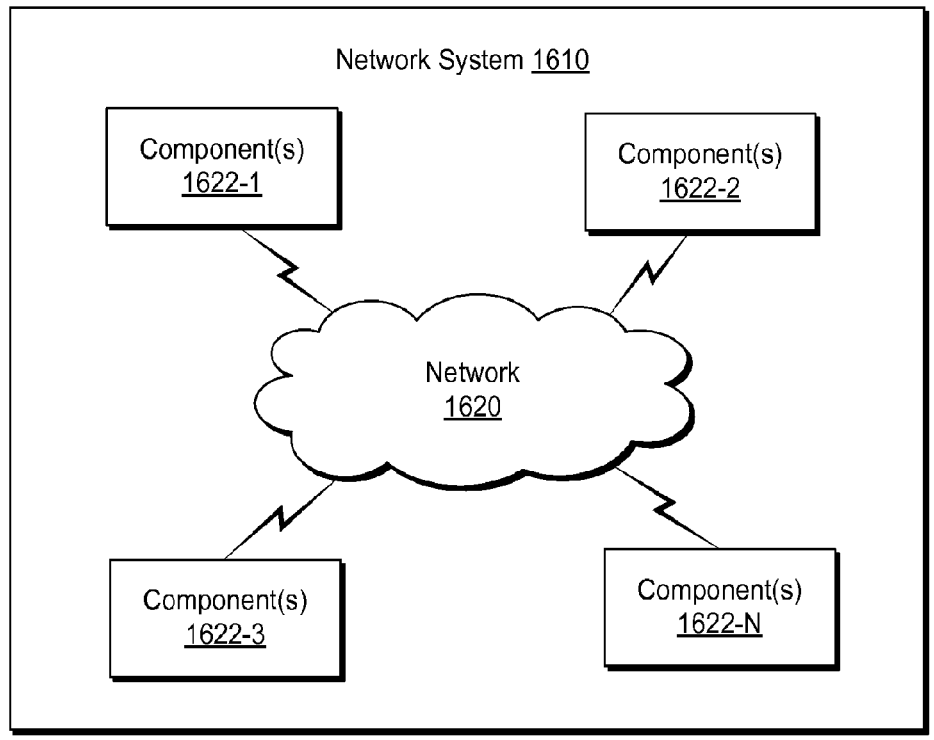
Fig. 16

DETERMINING CHANGE IN PERMEABILITY CAUSED BY A HYDRAULIC FRACTURE IN RESERVOIRS

RELATED APPLICATIONS

This application claims priority to and the benefit of a U.S. Provisional Patent Application having Ser. No. 61/837,705, filed Jun. 21, 2013, which is incorporated herein by reference.

BACKGROUND

A geologic environment can include fractures such as natural fractures, artificial fractures or both. A fracture may be characterized as, for example, a crack or surface of breakage in a geologic environment (e.g., a crack in rock, layers of rock, etc.). As an example, a fracture along which there has been displacement may be considered a fault. Fractures may enhance permeability of a geologic environment. For example, a fracture may have permeability greater than that of surrounding rock such that fluid (e.g., gas, liquid, etc.) may flow more readily in the fracture than in the surrounding rock. Where a geologic environment includes a reservoir, fractures may provide for transport of fluid to the reservoir, from the reservoir or both. Various technologies, techniques, etc. described herein pertain to understanding fracture characteristics in a geologic environment.

SUMMARY

A method can include deriving a cloud of microseismic events corresponding to a fracturing operation in an environment by spatially locating the microseismic events in the environment via a seismic velocity model; extracting a set of fracture planes from the microseismic cloud; assigning characteristics to the fracture planes; determining a second-rank fracture compliance tensor and a fourth-rank fracture compliance tensor based on the characteristics of the fracture planes; determining a change in elastic stiffness of the environment using the second-rank fracture compliance tensor and the fourth-rank compliance tensor; and updating the seismic velocity model based at least in part on the change in the elastic stiffness of the environment and/or determining permeability in the environment based at least in part on fracture plane locations, orientations and apertures. One or more computer-readable media can include computer-executable instructions to instruct a computing system to: derive a cloud of microseismic events corresponding to a hydraulic fracturing operation in a geologic environment by spatially locating the microseismic events in the geologic environment via a seismic velocity model; extract a set of fracture planes from the microseismic cloud; assign characteristics to the fracture planes where the characteristics include aperture, normal compliance and shear compliance; determine a second-rank fracture compliance tensor and a fourth-rank fracture compliance tensor based on the characteristics of the fracture planes; determine a change in elastic stiffness of the geologic environment using the second-rank fracture compliance tensor and the fourth-rank compliance tensor; and determine permeability in the geologic environment based at least in part on fracture plane locations, orientations and apertures and/or determine permeability in the environment based at least in part on fracture plane locations, orientations and apertures. A system can include one or more processors; memory; processor-executable instructions stored in the memory to derive a cloud of microseismic events corresponding to a hydraulic fracturing operation in a geologic environment by spatially locating the microseismic events in the geologic environment via a seismic velocity model; extract a set of fracture planes from the microseismic cloud; assign characteristics to the fracture planes where the characteristics include aperture, normal compliance and shear compliance; determine a second-rank fracture compliance tensor and a fourth-rank fracture compliance tensor based on the characteristics of the fracture planes; and determine permeability in the geologic environment based at least in part on fracture plane locations, orientations and apertures and/or determine permeability in the environment based at least in part on fracture plane locations, orientations and apertures. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Features and advantages of the described implementations can be more readily understood by reference to the following description taken in conjunction with the accompanying drawings.

FIGS. 1.1 to 1.4 illustrate simplified, schematic views of an example of an oilfield;

FIG. 2 illustrates a schematic view, partially in cross section of an example of an oilfield;

FIG. 9 illustrates schematic views of examples of a geologic environment;

FIGS. 10 and 11 illustrate examples of a method;

FIG. 15 illustrates schematic views of an example of a system and an example of a geologic environment; and FIG. 16 illustrates an example of system components and an example of a network system.

DETAILED DESCRIPTION

Figure 3:
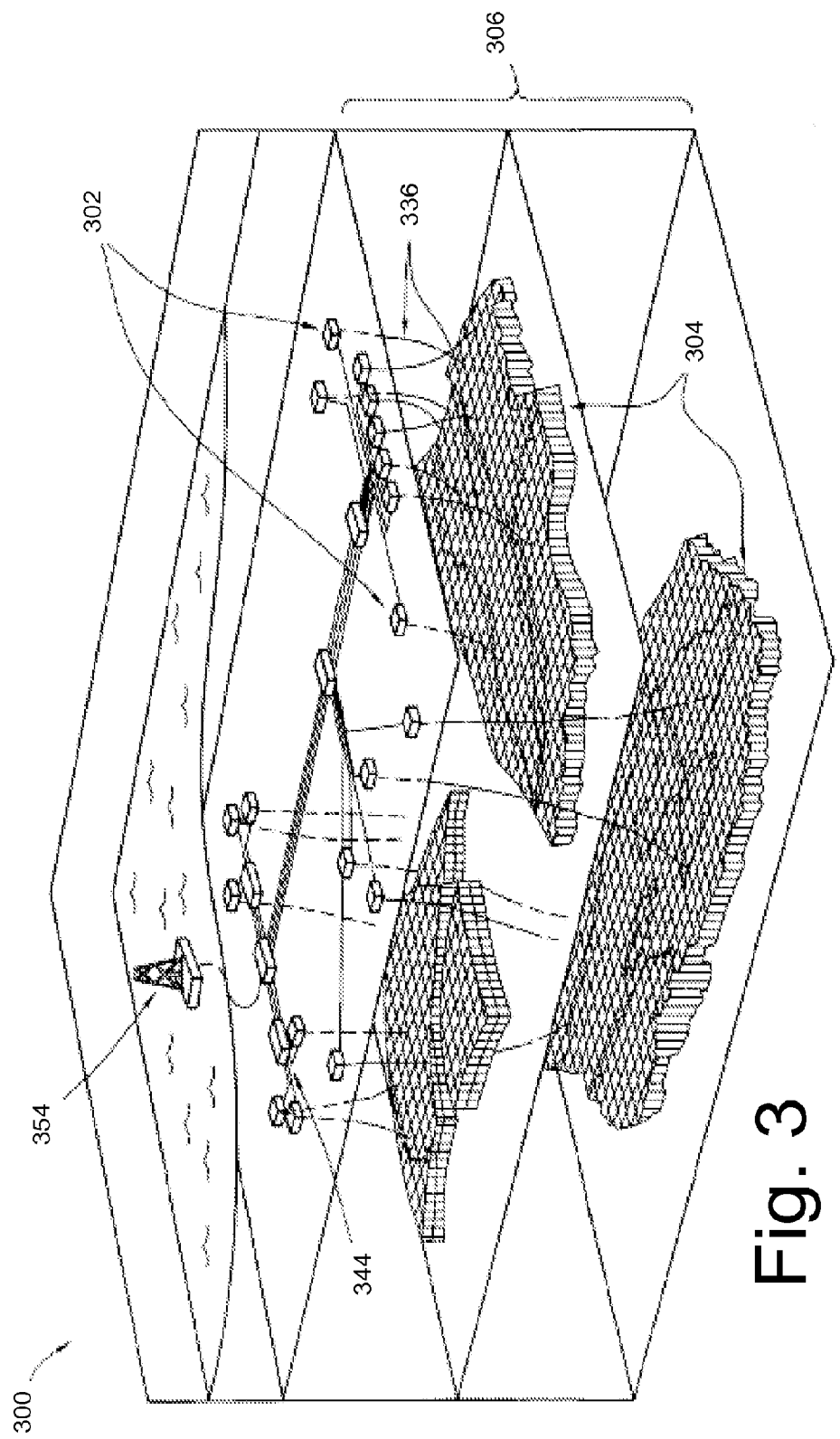
FIG. 3 illustrates a schematic view of an example of a production system for performing one or more oilfield operations.

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

As mentioned, a geologic environment may include natural fractures, artificial fractures or both. A fracture in a geologic environment may be beneficial or detrimental, for example, depending on how it may affect various phenomena. For example, if a goal is to produce a resource from a reservoir in a geologic environment, a fracture may be beneficial if it facilitates production of the resource (e.g., act to beneficially channel the resource) and it may be detrimental if it acts to impede production of the resource (e.g., acts to detrimentally disperse the resource). As an example, in some shale reservoirs, natural fractures improve production by enhancing effective permeability while, in other cases, natural fractures can complicate production.

Where artificial fractures are to be generated, proper planning and assessment of such generated artificial fractures can enhance resource production, fluid injection, etc. Artificial fractures may be generated as part of a stimulation treatment. As an example, a stimulation treatment may be applied to oil and gas wells in low-permeability reservoirs. In such an example, fluid may be pumped at high pressure and rate into a reservoir interval to be treated, for example, to cause opening of a vertical fracture. So-called "wings" of a fracture tend to extend outwardly away from a stimulation treatment wellbore, for example, in opposing directions according to natural stresses within a geologic environment (e.g., within a geologic formation). As an example, proppant, such as grains of sand of a particular size, may be mixed with treatment fluid to "prop" open a fracture while still providing for enhanced permeability. As an example, hydraulic fracturing may be a stimulation treatment that aims to create high-conductivity communication with a large area of formation and, for example, to bypass any damage that may exist in a near-wellbore area.

As an example, a method can include determining permeability enhancement and elastic stiffness decrease caused by a hydraulic fracture (or fractures) in a low permeability reservoir such as, for example, a gas shale reservoir. Such a method may include analyzing microseismic events, for example, recorded during a hydraulic fracture treatment. Such analyzing may aim to identify one or more artificial fracture planes that gave rise to the microseismic events.

As an example, a method may include microseismic monitoring to record microseismic events. Microseismic monitoring may include recording seismic energy during propagation of a hydraulic fracture, for example, as the fracture advances through a formation. In such an example, so-called "microseisms" may be detected and stored (e.g., in a data storage device). An analysis of such microseisms may allow for approximating location and propagation of a hydraulic fracture. As an example, monitored activities may be animated to show progressive fracture growth and, for example, subsurface response to pumping, etc. Where real-time monitoring is available, a stimulation treatment process may be dynamically controlled, for example, for purposes of optimization. As an example, effectiveness of a stimulation treatment applied to a reservoir may be used to enhance reservoir development (e.g., in shale gas completions, etc.).

FIGS. 1.1 through 1.4 illustrate simplified, schematic views of an example of an oilfield 100 that includes a subterranean formation 102 (e.g., a geologic environment) with a reservoir 104 therein in accordance with implementations of various examples of technologies and examples of techniques described herein. FIG. 1.1 illustrates an example of a survey operation being performed by a survey tool, such as a seismic truck 106.1, to measure properties of the subterranean formation where, for example, the survey operation is a seismic survey operation for producing sound vibrations. In FIG. 1.1, one such sound vibration, a sound vibration 112 generated by a source 110, reflects off horizons 114 in an earth formation 116. A set of sound vibrations is received by sensors, such as geophone-receivers 118, situated on the Earth's surface. The data received 120 is provided as input data to, for example, a computer 122.1 of a seismic truck 106.1, and responsive to the input data, the computer 122.1 generates seismic data output 124. This seismic data output may be stored, transmitted or further processed as desired, for example, by data reduction.

FIG. 1.2 illustrates an example of a drilling operation being performed by drilling tools 106.2 suspended by a rig 128 and advanced into the subterranean formation 102 to form a wellbore 136. In the example of FIG. 1.2, a mud pit 130 is used to draw drilling mud into the drilling tools via a flow line 132 for circulating drilling mud down through the drilling tools, then up the wellbore 136 and back to the surface. The drilling tools are advanced into the subterranean formation 102 to reach the reservoir 104. Each well may target one or more reservoirs. The drilling tools may be adapted for measuring downhole properties (e.g., using logging while drilling). Such logging while drilling tools may also be adapted for taking a core sample 133 as shown.

Computer facilities may be positioned at various locations about the oilfield 100 (see, e.g., the surface unit 134) and/or at remote locations. The surface unit 134 may be used to communicate with the drilling tools and/or offsite operations, as well as with other surface or downhole sensors. The surface unit 134 may be capable of communicating with the drilling tools to send commands to the drilling tools, and to receive data therefrom. The surface unit 134 may also collect data generated during the drilling operation and produce data output 135, which may then be stored, transmitted, etc.

Sensors (S), such as gauges, may be positioned about the oilfield 100 to collect data relating to various oilfield operations as described previously. As shown in the example of FIG. 1.2, a sensor (S) may be positioned in one or more locations in the drilling tools and/or at the rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

The drilling tools 106.2 may include a bottom hole assembly (BHA) (not shown), generally referenced, near the drill bit (e.g., within several drill collar lengths from the drill bit). The bottom hole assembly can include capabilities for measuring, processing, and storing information, as well as communicating with the surface unit 134. The bottom hole assembly further includes drill collars for performing various other measurement functions.

The bottom hole assembly may include a communication subassembly that communicates with the surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electromagnetic signal, which is representative of the measured drilling parameters. It will be appreciated by one of skill in the art that a variety of telemetry systems may be employed, such as wired drill pipe, electromagnetic or other known telemetry systems.

As an example, a wellbore may be drilled according to a drilling plan that is established prior to drilling. The drilling plan may set forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also be adjusted as new information is collected.

The data gathered by sensors (S) may be collected by the surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

The surface unit 134 may include a transceiver 137 to allow communications between the surface unit 134 and various portions of the oilfield 100 or other locations. The surface unit 134 may also be provided with or functionally connected to one or more controllers (not shown) for actuating mechanisms at the oilfield 100. The surface unit 134 may then send command signals to the oilfield 100 in response to data received. The surface unit 134 may receive commands via the transceiver 137 or may itself execute commands to the controller. A processor may be provided to analyze the data (locally or remotely), make the decisions and/or actuate the controller. In this manner, the oilfield 100 may be selectively adjusted based on the data collected. Such a technique may be used to optimize portions of the field operation, such as controlling drilling, weight on bit, pump rates, or other parameters. Such adjustments may be made, for example, automatically based on computer protocol, and/or manually by an operator. In some cases, well plans may be adjusted to select optimum operating conditions, or to avoid problems.

FIG. 1.3 illustrates an example of a wireline operation being performed by a wireline tool 106.3 suspended by the rig 128 and into the wellbore 136. The wireline tool 106.3 may be adapted for deployment into the wellbore 136 for generating well logs, performing downhole tests and/or collecting samples. The wireline tool 106.3 may optionally help to perform one or more other operations, for example, placement of an explosive, radioactive, electrical, or acoustic energy source 144 that sends and/or receives signals to and from the surrounding subterranean formation 102 (e.g., and fluids therein).

The wireline tool 106.3 may be operatively connected to, for example, the geophones 118 and the computer 122.1 of the seismic truck 106.1. The wireline tool 106.3 may also provide data to the surface unit 134. The surface unit 134 may collect data generated during the wireline operation and may produce the data output 135 that may be stored, transmitted, etc. The wireline tool 106.3 may be positioned at various depths in the wellbore 136 to provide a survey or other information relating to the subterranean formation 102.

Sensors (S), such as gauges, may be positioned about the oilfield 100 to collect data relating to various field operations as described previously. As shown, sensor S is positioned in the wireline tool 106.3 to measure downhole parameters which relate to, for example porosity, permeability, fluid composition and/or other parameters of the field operation.

FIG. 1.4 illustrates an example of a production operation being performed by a production tool 106.4 deployed from a production unit or a Christmas tree 129 and into a completed wellbore 137 for drawing fluid from the downhole reservoirs into surface facilities 142. The fluid flows from the reservoir 104 through perforations in the casing (not shown) and into the production tool 106.4 in the completed wellbore 137 and to the surface facilities 142 via a gathering network 146.

Sensors (S), such as gauges, may be positioned about the oilfield 100 to collect data relating to various field operations as described previously. As shown, the sensor (S) may be positioned in the production tool 106.4 or associated equipment, such as the Christmas tree 129, the gathering network 146, the surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While the examples of FIGS. 1.2 through 1.4 illustrate some tools used to measure properties of an oilfield, it will be appreciated that the tools may be used in connection with non-oilfield operations, such as gas fields, mines, aquifers, storage, or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of the examples of FIGS. 1.1 through 1.4 are intended to provide a brief description of an example of a field usable with oilfield application frameworks. Part, or all, of the oilfield 100 may be on land, water, and/or sea. Also, while a single field measured at a single location is depicted, oilfield applications may be utilized with any combination of one or more oilfields, one or more processing facilities and one or more wellsites.

FIG. 2 shows a schematic view, partially in cross section of an example of an oilfield 200 having data acquisition tools 202.1, 202.2, 202.3 and 202.4 positioned at various locations along the oilfield 200 for collecting data of a subterranean formation 204. The data acquisition tools 202.1, 202.2, 203.3 and 202.4 may be, for example, provided as the data acquisition tools 106.1, 106.2, 106.3 and 106.4 of the examples of FIGS. 1.1 through 1.4, respectively, or others not depicted. As shown in the example of FIG. 2, the data acquisition tools 202.1, 202.2, 202.3 and 202.4 can generate data plots or measurements 208.1, 208.2, 208.3, 208.4, 202.1, 202.2, 202.3 and 202.4, respectively. Such data plots are depicted along the oilfield 200 as examples to demonstrate data generated by various operations.

In FIG. 2, the data plots 208.1, 208.2, and 208.3 are examples of static data plots that may be generated by the data acquisition tools 202.1, 202.2, 202.3 and 202.4, respectively. The static data plot 208.1 is an example of a seismic two-way response time (TWT). The static plot 208.2 is an example of a core sample data measured from a core sample of the formation 204. The static data plot 208.3 is an example of a logging trace. A production decline curve or graph 208.4 is an example of a dynamic data plot of the fluid flow rate over time. Other data may also be collected, such as historical data, user inputs, economic information and/or other measurement data and other parameters of interest.

In FIG. 2, the subterranean structure 204 has a plurality of geological formations or layers. As shown, the several formations or layers include a shale layer 206.1, a carbonate layer 206.2, a shale layer 206.3, and a sand layer 206.4. A fault 207 extends through the layers 206.1 and 206.2. The static data acquisition tools may be adapted to take measurements and detect characteristics of the formations. As an example, a wellbore (e.g., a well) may be formed laterally within at least a portion of a lateral shale layer such as the shale layer 206.1. In such an example, information may be acquired and assessed to determine variations in properties, for example, that may be associated with a shale reservoir. Such information may assist with planning, operations, etc. associated with shale reservoir evaluation, drilling, fracturing, completions, production management, etc.

While a specific subterranean formation with specific geological structures is depicted in FIG. 2, it will be appreciated that the oilfield 200 may contain a variety of geological structures and/or formations. In some locations, typically below the water line, fluid may occupy pore spaces of the formations. Each of the measurement devices may be used to measure properties of the formations and/or its geological features. While each acquisition tool is shown as being in specific locations in the oilfield 200, it will be appreciated that one or more types of measurement may be taken at one or more location across one or more oilfields or other locations for comparison and/or analysis.

Data collected from various sources, such as the data acquisition tools of FIG. 2, may be processed and/or evaluated. As an example, seismic data displayed in the static data plot 208.1 from the data acquisition tool 202.1 may be analyzed by a geophysicist to determine characteristics of the subterranean formations and features. As an example, core data shown in the static plot 208.2 and/or log data from the well log 208.3 may be analyzed by a geologist to determine various characteristics of the subterranean formation. As an example, production data from the graph 208.4 may be analyzed by a reservoir engineer to determine fluid flow reservoir characteristics. Data analyzed by a geologist, geophysicist, a reservoir engineer, etc., may optionally be analyzed using one or more modeling techniques.

As an example, various equipment, processes, etc., described with respect to FIGS. 1.1 through 1.4 and FIG. 2 may be implemented for purposes of microseismic monitoring, stimulation treatment, etc. For example, where a stimulation treatment is performed on the formation 102 (e.g., via a well), seismic monitoring equipment may monitor seismic energy stemming from the stimulation treatment. In such an example, various microseismic events may occur as the stimulation treatment proceeds. As an example, such events may be located in space (e.g., and time) using the monitored seismic energy. As mentioned, an animation may be based on such data to allow one to visually appreciate how an artificial fracture or fractures are generated in response to the stimulation treatment.

FIG. 3 shows an example of an oilfield 300 for performing production operations. As shown, the oilfield 300 includes a plurality of wellsites 302 operatively connected to a processing facility 354. Part, or all, of the oilfield 300 may be on land and/or sea. Also, while a single oilfield with a single processing facility and a plurality of wellsites is depicted any combination of one or more oilfields, one or more processing facilities and one or more wellsites may be present.

In the example of FIG. 3, each of the one or more wellsites 302 includes equipment that forms a respective wellbore 336 into the earth. Each of the wellbores 336 extends through a subterranean formation 306, which includes various layers and reservoirs 304. Such reservoirs may contain fluids, such as hydrocarbons (e.g., in one or more phases). In the example of FIG. 3, each of the wellsites 302 may draw fluid from one or more of the reservoirs 304 and pass such fluid or fluids to the processing facility 354, for example, via one or more surface networks 344. As an example, each of the surface networks 344 can include tubing and control mechanisms for controlling the flow of fluids from one or more wellsites 302 to the processing facility 354.

Given the various examples of FIGS. 1.1, 1.2, 1.3, 1.4, 2 and 3, various aspects of seismic data are described along with processing of such data, for example, to help identify one or more features in a geologic environment, whether natural, artificial or both.

Figure 4:
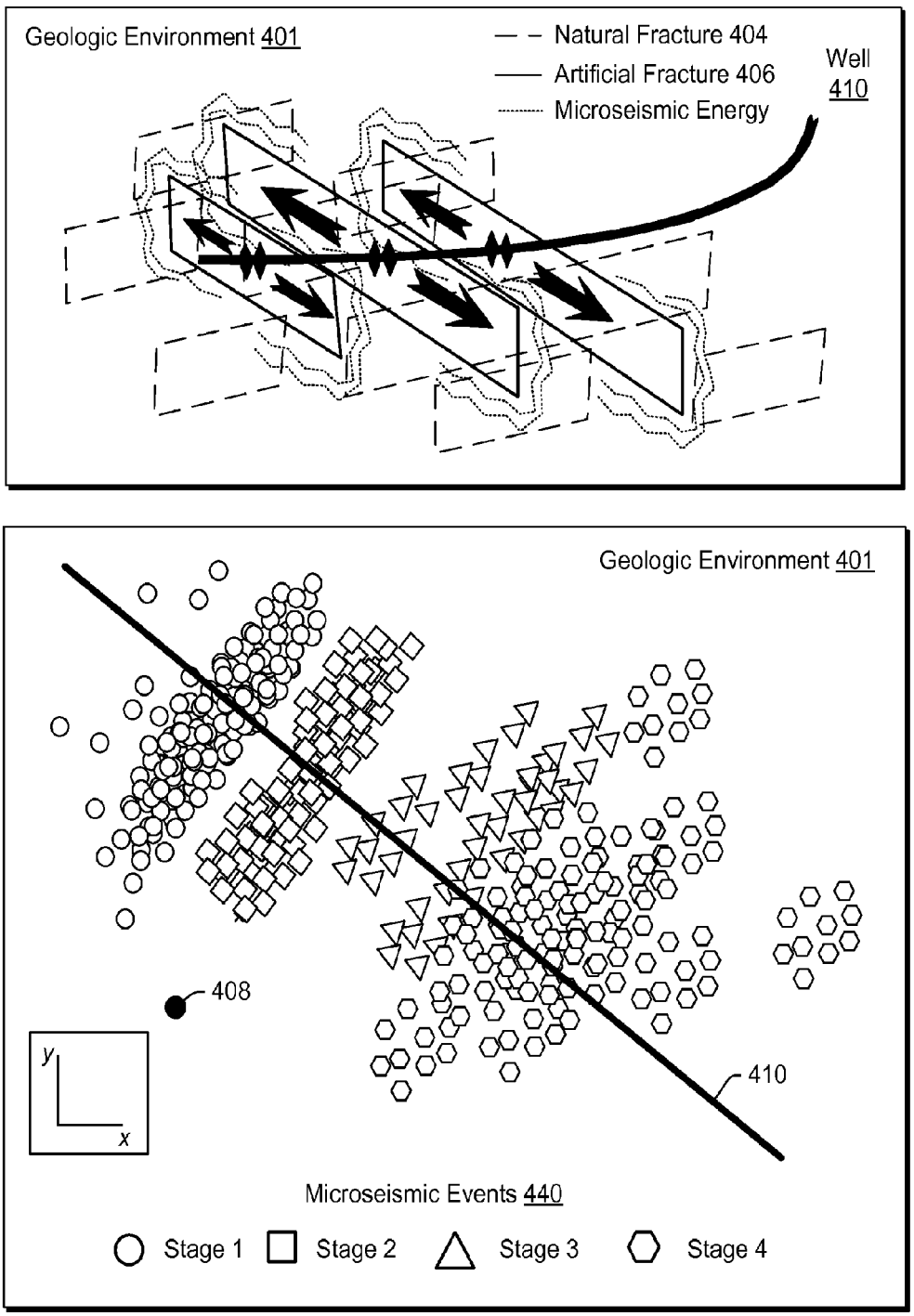
FIG. 4 illustrates an example of a geologic environment, fractures and microseismic events.

FIG. 4 shows an example of a geologic environment 401, in an approximate perspective view and an approximate plan view, where the geologic environment 401 includes natural fractures 404, artificial fractures 406, a well 408 and a well 410. In the example of FIG. 4, the natural fractures 404 extend longitudinally in one direction while the artificial fractures 406 extend longitudinally in another, different direction. As mentioned, artificial fractures may be generated via a stimulation treatment process using a well. For example, consider the well 410 being used to pump fluid into the geologic environment 401 to thereby generate the three artificial fractures 406 with wings extending outwardly away from the well 410. As an example, the well 408 may be used for sensing seismic energy. In the example of FIG. 4, dashed lines may represent a "shrink wrapping" of microseismic events associated with seismic waves that emanate over time during (e.g., and even possibly after) application of a stimulation treatment. For example, during hydraulic fracturing, rock may be continually fractured, and as a new fracture segment is formed a new microseismic event occurs, which emits seismic energy. Further, microseismic events may occur along both a new fracture (e.g., as rock is broken) and along one or more pre-existing fractures, for example, if slip occurs (e.g., as in an earthquake) or if "cement" within a natural fracture is broken.

In the plan view (see, e.g., x,y coordinate system), various microseismic events have been located where the events correspond to stage 1, stage 2, stage 3 and stage 4 events of a multi-stage stimulation treatment. As shown, the stage 1 and stage 2 events tend to be more defined and orthogonal to the well 410. In particular, the stage 1 events and the stage 2 events form width/length ratios that are considerably less than for those of the stage 3 events and the stage 4 events. While after acquisition seismic energy and locating events therefrom, it may be unknown which fracture stages provide the largest increase in permeability, the information can be useful for assessing effectiveness of the fracture treatments and, for example, to improve design of one or more future fracture stages, to plan one or more future wells, etc.

Figure 5:
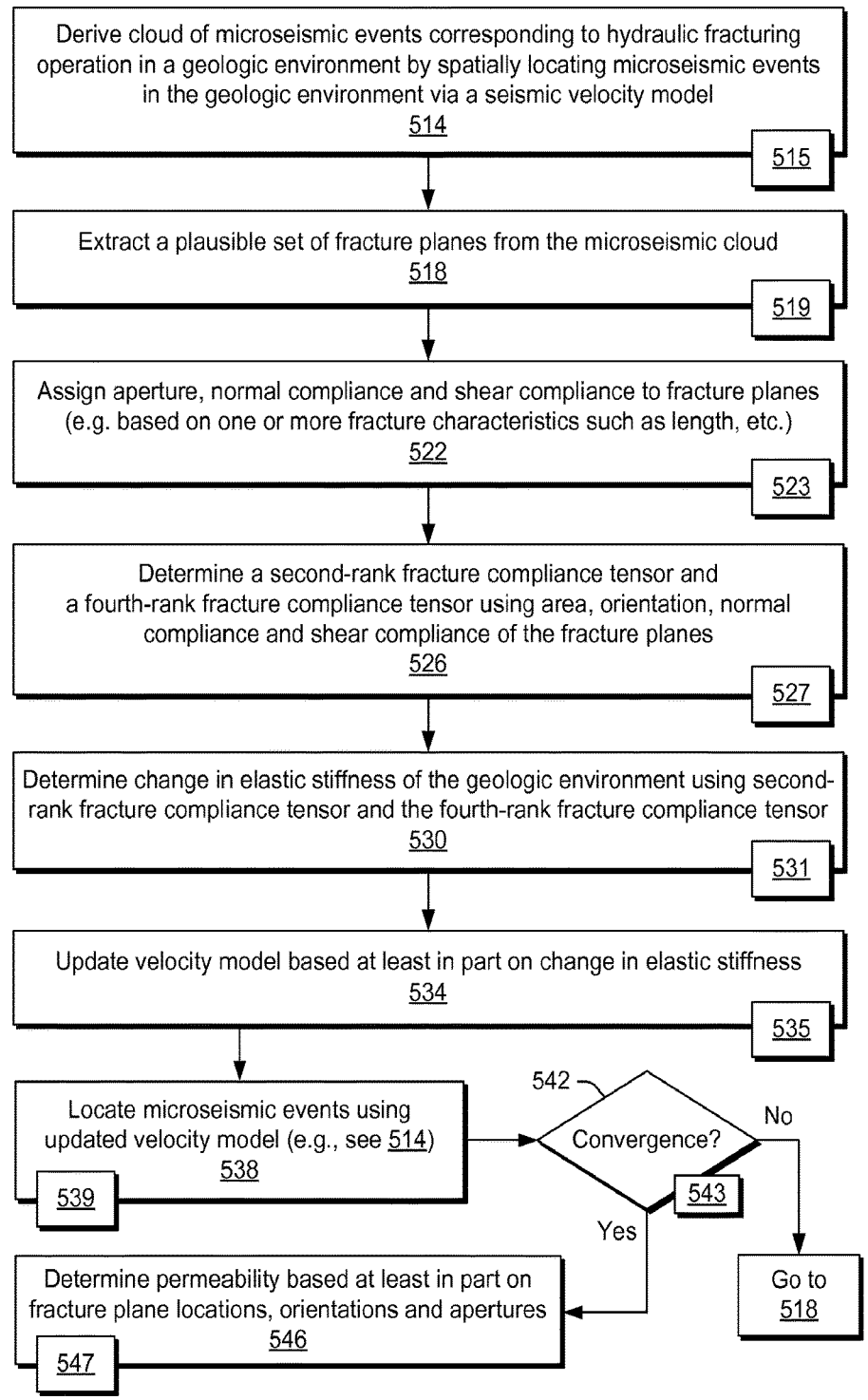
FIG. 5 illustrates an example of a method.

FIG. 5 shows an example of a method 500 that may, for example, use information such as the information presented in FIG. 4, for assessing effectiveness of one or more fracture treatments, for improving design of one or more future fracture stages, for planning one or more future wells, etc.

As shown in FIG. 5, the method 500 can include: a derivation block 514 for deriving a cloud of microseismic events corresponding to a hydraulic fracturing operation in a geologic environment by spatially locating the microseismic events in the geologic environment via a seismic velocity model; an extraction block 518 for extracting a set of fracture planes from the microseismic cloud (e.g., an approximate or plausible set of fracture planes); an assignment block 522 for assigning characteristics to the fracture planes where the characteristics include aperture, normal compliance and shear compliance; a determination block 526 for determining a second-rank fracture compliance tensor and a fourth-rank fracture compliance tensor based on the characteristics of the fracture planes; a determination block 530 for determining a change in elastic stiffness of the geologic environment using the second-rank fracture compliance tensor and the fourth-rank compliance tensor; and an update block 534 for updating the seismic velocity model based at least in part on the change in the elastic stiffness of the geologic environment. As an example, the method 500 may include performing an operation on the geologic environment based at least in part on the updated seismic velocity model, for example, where the operation may be a stimulation treatment operation, a well operation, a production operation, an injection operation, etc.

As an example, the method 500 may include a locate block 538 for spatially locating the microseismic events in the geologic environment via the updated seismic velocity model (e.g., akin to the process of the block 514). In such an example, the method 500 may include a decision block 542. For example, the decision block 542 may include comparing spatial locations of the microseismic events via the seismic velocity model to spatial locations of the microseismic events via the updated seismic velocity model and, for example, assessing the comparing with respect to one or more convergence criteria. In such an example, for an unfavorable assessment, the method 500 may include continuing to the extraction block 518 for repeating the extracting using the spatial locations of the microseismic events via the updated seismic velocity model (e.g., to "relocate" the events); whereas, for a favorable assessment, the method 500 may include continuing to a determination block 546 for determining permeability in the geologic environment based at least in part on fracture plane locations, orientations and apertures. As an example, a convergence criterion may be a number of iterations, a time limit for computational time, etc.

As an example, a method may include determining permeability in a geologic environment based at least in part on fracture plane locations, orientations and apertures. For example, such a method may be performed whether or not a convergence criterion or criteria are applied for spatial locations of microseismic events. As an example, a method may include determining permeability in a geologic environment based at least in part on fracture plane locations, orientations and apertures whether the fracture plane locations are those of a seismic velocity model or an updated seismic velocity model. For example, a method may include determining permeability in a geologic environment based at least in part on fracture plane locations, orientations and apertures where at least the fracture plane locations are based at least in part on spatial locations of the microseismic events in the geologic environment via the updated seismic velocity model.

As an example, a method may include assessing convergence based on differences in locations of microseismic events, for example, as derived from two or more seismic velocity models. For example, if a root mean square difference in locations of microseismic events falls below some threshold then convergence may be affirmed. As an example, a method may include determining that locations diverge, which may indicate that parameters such as fracture compliance may have been inappropriate and in need of revision.

As an example, permeability may be determined based on fracture plane locations, orientations and apertures; noting that elastic stiffness tensors may be useful, for example, depending on particular purpose, operation, etc.

The method 500 is shown in FIG. 5 in association with various computer-readable media (CRM) blocks 515, 519, 523, 527, 531, 535, 539, 543, 547, and 551. Such blocks generally include instructions suitable for execution by one or more processors (or cores) to instruct a computing device or system to perform one or more actions. Thus, such instructions may be referred to as executable instructions (e.g., computer-executable, processor-executable, etc.). While various blocks are shown, a single medium may be configured with instructions to allow for, at least in part, performance of various actions of the method 500.

Figure 6:
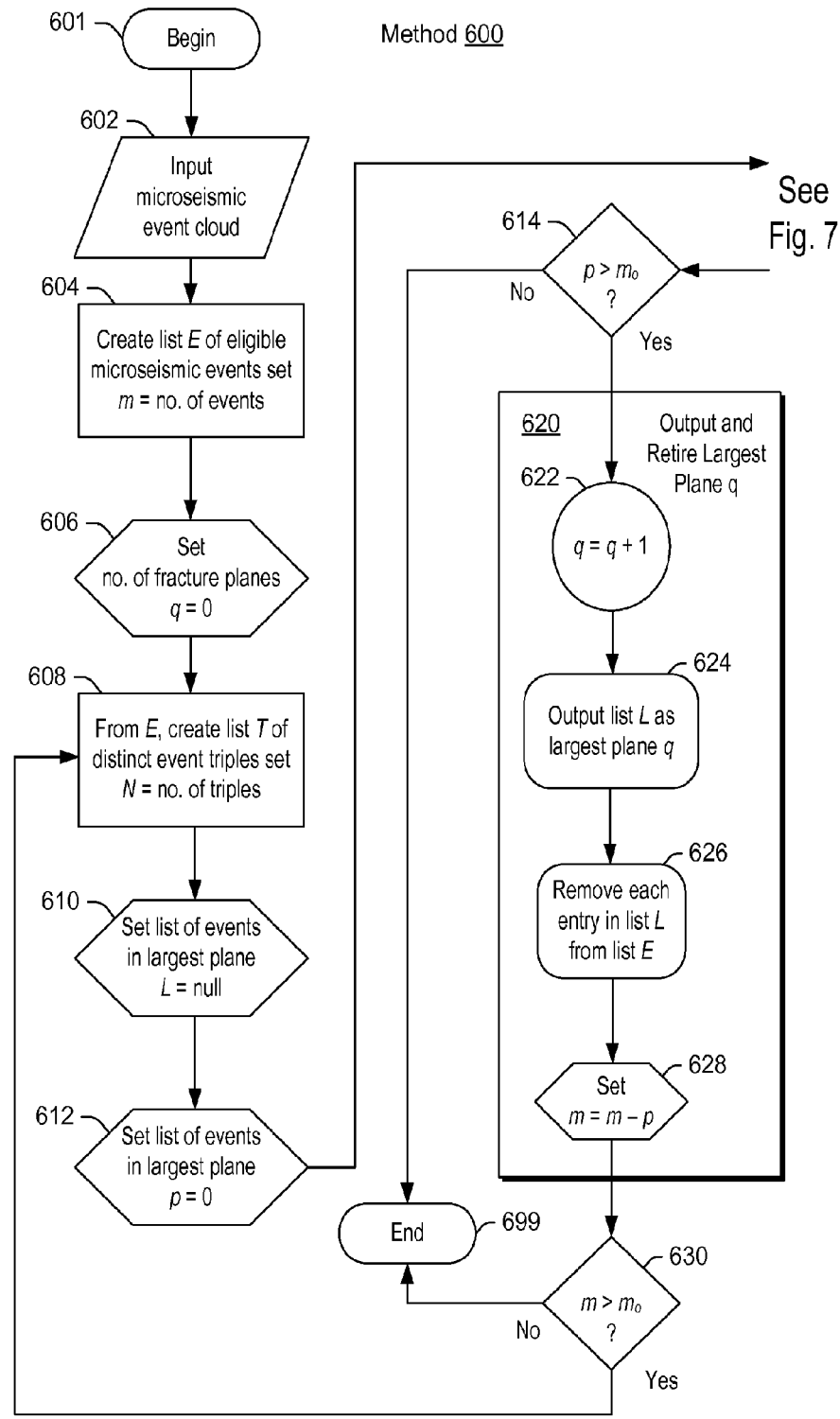
FIGS. 6, 7 and 8 illustrate an example of a method.
Figure 7:
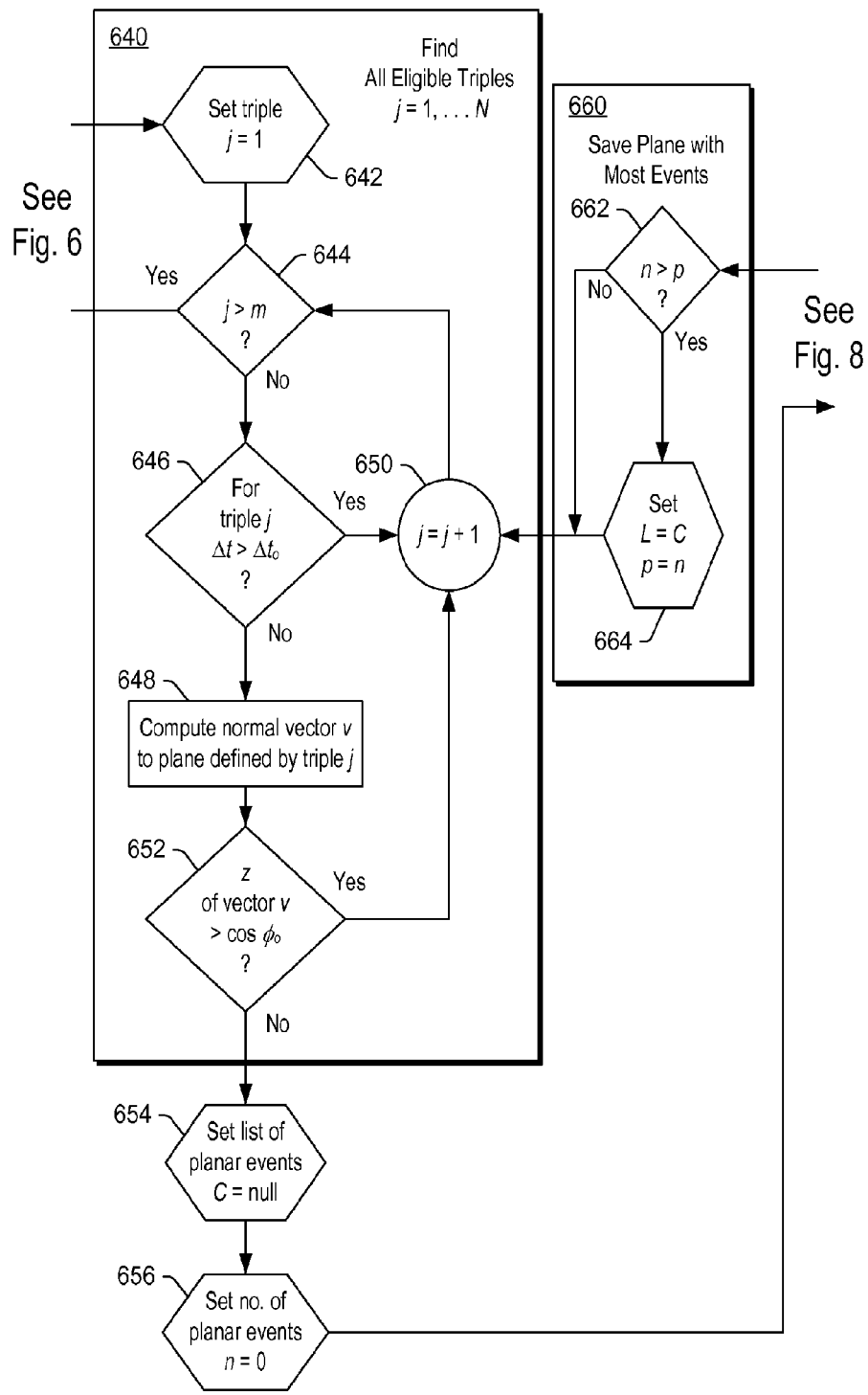
Figure 8:
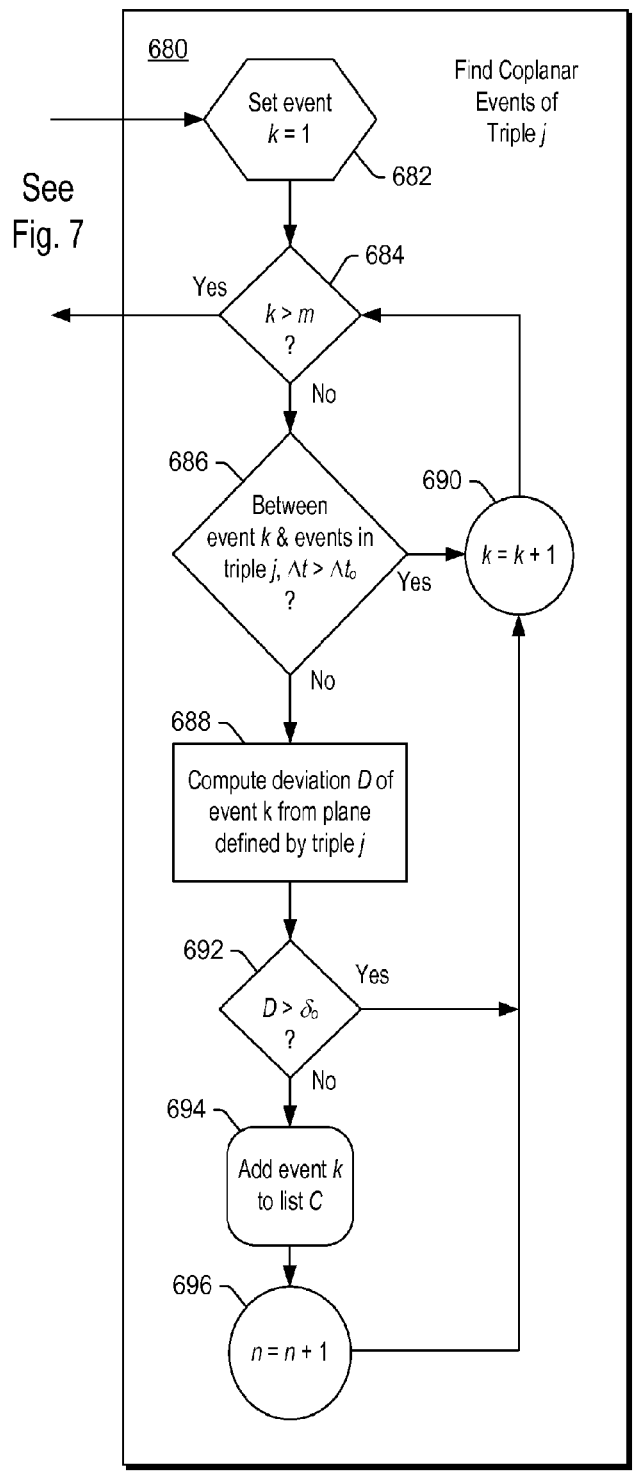

As an example, the method 500 may include determining permeability enhancement and elastic stiffness decrease caused by one or more hydraulic fractures in a low permeability reservoir (e.g., consider a gas shale reservoir). As mentioned, microseismic monitoring may record microseismic events during a hydraulic fracture treatment to identify a generated fracture plane leading to the microseismic events. FIGS. 6, 7 and 8 show an example of a method 600 that may be implemented for locating microseismic events, for example, as being associated with a plane.

As an example, given an input cloud of microseismic events, the method 600 may be implemented to extract fracture planes via progressive combinatoric depletion (e.g., consider an approach based on vector algebra). As an example, a microseismic event cloud may be a collection of points in a 3D space ($\mathscr{R}^3$), which represents at least a portion of a geologic environment. In such an example, an equation for an arbitrary plane $\pi$ in $\mathscr{R}^3$ may be defined by 3 distinct (non-coincident) points $p_o$, $p_1$, $p_2$ and may be obtained from a vector dot-product:

$$\hat{n} \cdot (p - p_o) = 0 \tag{1}$$

where p denotes an arbitrary point (x, y, z) and $\hat{n} = (n_x, n_y, n_z)$ denotes the unit normal to plane $\pi$, obtained via a vector cross-product:

$$n = (p_1 - p_o) \times (p_2 - p_o) = 0 \tag{2}$$

which may be normalized by dividing by vector length:

$$\hat{n} = \frac{n}{\sqrt{n \cdot n}} \tag{3}$$

As an example, equation (1) may be represented in a generalized form:

$$\hat{n} \cdot (p - p_o) \leq \delta_o, \delta_o \geq 0 \tag{4}$$

where $\delta_o$ may be defined as the maximum planar deviation. An arbitrary microseismic event p may thus be defined as being coplanar (e.g., sufficiently close to a plane $\pi$ to be considered located on that plane), if equation (4) holds. As an example, by restricting an angular dip $\phi$ of the plane $\pi$ by a constraint $\phi \geq \phi_o$, where $\phi$ is defined as the minimum planar dip, the following condition may be set forth:

$$|\hat{n}_z| \leq \cos \phi_o, \phi_o \geq 0 \tag{5}$$

As an example, a method may include restricting a temporal deviation $\Delta t$ between microseismic events by a constraint $\Delta t \leq \Delta t_o$, where $\Delta t_o$ may be defined as a maximum time interval:

$$\Delta t_o \geq \begin{cases} |t_1 - t_o| \\ |t_2 - t_o|, \quad \Delta t_o > 0 \\ |t - t_o| \end{cases} \tag{6}$$

where $t_o$, $t_1$, $t_2$ are times associated with events $p_o$, $p_1$, $p_2$ and t is the time of event p.

Given a set of m distinct microseismic events, the number N of distinct triples (particular combinations of three microseismic events) may be given as:

$$N = C_3^m = \frac{1}{6}m(m-1)(m-2) \quad (7)$$

As an example, the method 600 may include a search algorithm that loops over a number of distinct triples to identify the largest set of correlated coplanar events satisfying equations (4), (5), and (6). Once identified, the microseismic events of this largest plane may be retired from the microseismic cloud. As appropriate, a search cycle may be repeated, for example, until either: (i) no plane satisfying equations (3), (4), and (5) can be found, or (ii) the number of residual events is less than a threshold $m_0$ (e.g., a minimum of events).

As illustrated in FIGS. 6, 7 and 8, the method 600 can include an input block 602 for inputting a microseismic event cloud, a create block 604 for creating a list E of eligible microseismic events of a set m where m equals a number of events, a set block 606 for setting a number of fracture planes q equal to zero, a create block 608 for creating from the list E a list T of distinct event triples as a set N where N equals a number of triples, a set block 610 for setting a list of events in a largest plane L to null, and a set block 612 for setting a list of events in the largest plane p equal to zero.

As shown in FIG. 6, a process 620 operates based on a decision block 614 for deciding whether p is greater than the threshold $m_0$ and causes the method 600 to continue at the create block 608 per a decision block 630 for deciding if m is greater than the threshold $m_0$. As shown, where the decision block 614 decides that p is greater than $m_0$, the method 600 enters the process 620, otherwise it terminates at an end block 699; and, where the decision block 630 decides that m is greater than $m_0$, the method 600 continues to the create block 608, otherwise it terminates at the end block 699. Input to the decision block 630 depends on output from the process 620, which outputs and retires the largest plane q. As shown the process 620 includes a set block 622 for setting q equal to q plus one (e.g., increment), an output block 624 for outputting the list L as the largest plane q, a removal block 626 for removing each entry in the list L from the list E (e.g., retiring) and a set block 628 for setting m equal to m minus p.

Referring to FIG. 7, a process 640 is shown for finding eligible triples, denoted j where j equals an integer, for example, from 1 to N. In the method 600, the process 640 continues from the set block 612 and the process 640 also continues to the decision block 614 (see FIG. 6), for example, to perform the output and retire process 620 or to terminate the method 600 at the end block 699.

The process 640 includes a set block 642 for setting a triple j equal to one and a decision block 644 for deciding if j is greater than m. As indicated if the decision block 644 decides that j is greater than m, the method 600 continues at the decision block 614, otherwise, the method 600 continues at a decision block 646 of the process 640. The decision block 646 provides for deciding if, for triple j, a time interval $\Delta t$ is greater than a time interval threshold $\Delta t_o$. As shown, where the decision block 646 decides that the time interval condition is met, the method 600 continues to a set block 650 for setting j equal to j plus one (e.g., to increment j), otherwise, the method 600 continues to a compute block 648 for computing a normal vector v to a plane defined by a triple j. As indicated, the compute block 648 provides the vector v to a decision block 652 for deciding if a z component of the vector j is greater than the cosine of an angle $\phi_0$, which, as mentioned above, may be a minimum planar dip. Where the decision block 652 decides that the condition is met, the method 600 continues to the set block 650 (e.g., to increment j), otherwise, the method 600 continues out of the process 640 and to a set block 654 for setting a list of planar events C to null followed by another set block 656 for setting a number of planar events n to zero. Thereafter, the method 600 continues to a process 680, which acts to find coplanar events of a triple j.

FIG. 7 also shows a process 660 that acts to save a plane with the most events. The process 660 follows from the process 680 of FIG. 8 and continues to the set block 650, which, as mentioned, acts to increment j. As shown, the process 660 includes a decision block 662 for deciding if n is greater than p and, if so, continuing to a set block 664 for setting the list L to the list C and for setting p to n and thereafter to the set block 650 of the process 640. Where the decision block 662 decides that n is not greater than p, the process 660 also continues to the set block 650 of the process 640.

Referring to the process 680 of FIG. 8, it includes a set block 682 for setting an event k equal to one and a decision block 684 for deciding if k is greater than m. As shown, where k is greater than m, the method 600 exits the process 680 and continues to the process 660 (see FIG. 7). Where the decision block 684 decides that k is not greater than m, the process 680 continues to a decision block 686 for deciding if a time interval $\Delta t$ between an event k and events in a triple j is greater than a time interval threshold $\Delta t_o$. Where the condition is met, the process 680 continues to a set block 690 for setting k equal to k plus one (e.g., incrementing k) and then to the decision block 684, otherwise, the process 680 continues to a compute block 688 for computing a deviation D of event k from a plane defined by the triple j. As shown, a decision block 692 follows for deciding if the deviation D is greater than a parameter $\delta_o$, which may be defined as a maximum planar deviation. Where the condition is met, the process 680 continues to the set block 690, otherwise, the process 680 continues to an add block 694 for adding the event k to the list C followed by a set block 696 that sets n equal to n plus 1. Thereafter, the process 680 follows to the set block 690. As mentioned, the process 680 may exit to the process 660, for example, depending on a comparison of k to m (e.g., per the decision block 684).

As an example, a method may include the following actions 1 to 9:
1. set q, the number of fracture planes embedded in the micro-seismic cloud, to zero
2. construct a list E, of eligible microseismic events in a cloud of events 1 . . . m
3. set N, the number of entries in a list T, to $$\frac{1}{6}m(m-1)(m-2)$$

4. from the list E, construct the list T, which includes distinct triples 1 . . . N
5. set the list L, the list of events including the largest fracture plane, to null 6. set p, the number of entries in the list L, to zero
7. set j=1 and perform the following actions for each triple j=1 . . . N in the list T:
   A. if j>N advance to 8.
   B. if inequality (6) is false for any event in triple j, increment j and return to A.
   C. compute the unit normal vector to the plane defined by triple j via (2) and (3)
   D. if inequality (5) is false, increment j and return to A.
   E. set C, the list of events which are coplanar with triple j, to null
   F. set n, the number of entries in list C, to zero
   G. set k=1 and perform the following actions for each event k=1 . . . m in the list E:
      i. if k>m advance to H.
      ii. if inequality (4) or (6) is false, increment k and return to action i.
      iii. add event k to the list C
      iv. increment n
      v. increment k and return to action i.
   H. if n>p perform the following actions:
      i. set p=n
      ii. set L=C
   I. increment j and return to action A.
8. if p≥$m_o$ perform the following actions:
   A. increment q
   B. output the list L as the largest plane q
   C. for each entry in list L, remove the same entry from the list E
   D. set m=m−p
   E. if m>$m_0$ return to action 3.
9. stop: the cloud includes q planes and m residual microseismic events As an example, a method can include two loops, for example, a first loop over N eligible event triples (e.g., where N=m(m−1)(m−2)/6) and a second loop over m eligible events. As an example, after a search cycle, p events in the largest plane found may be retired from a list of eligible events. In a subsequent cycle, computational demands may be reduced, for example, by a factor of approximately $(1-p/m)^3$, because the list of eligible triples is reduced. Such an approach to progressive combinatoric depletion may increase search speed for one or more successive cycles.

Referring to the derivation block 514 of the method 500 of FIG. 5, orientation of one or more fracture planes may be constrained, or validated, using available information on orientations of one or more natural fractures, the orientation of the principal stresses or by using the radius of gyration tensor (see, e.g., U.S. Pat. No. 7,869,954, which is incorporated herein by reference). As an example, many recorded microseismic events can involve shear displacement, and thus, orientation of natural fractures having a greatest resolved shear may be used as a constraint. Other type of constraints may include magnitude of the microseismic events, minimum dip, minimum and maximum azimuths, confidence and time correlation, and maximum point deviation.

As to the assignment block 522 of the method 500, fracture aperture and normal and shear compliances may be assigned to particular fracture planes. In one implementation, the fracture aperture and normal and shear compliances may be assigned based on certain fracture characteristics (e.g., computed length and area of the fractures). As an example, the assignment block 522 may include using one or more relationships (e.g., a relation between fracture compliance and fracture length described in "The Compliance of Macrofractures," *The Leading Edge*, 26, 1118-1122 (2007) by Worthington, M.; a relation between fracture compliance and stress suggested in "Time-dependent Anisotropy Induced By Pore Pressure Variation in Fractured Rock," *Journal of Seismic Exploration*, 11, 83-105, by Schoenberg (2002), etc.).

As to the determination block 526 of the method 500, second-rank and fourth-rank fracture compliance tensors $\alpha_{ij}$ and $\beta_{ijkl}$ may be computed using area, orientation, and normal and shear compliances of fracture planes (e.g., per the block 518). As an example, second-rank and fourth-rank fracture compliance tensors $\alpha_{ij}$ and $\beta_{ijkl}$ such as those described in "Microcrack-induced Elastic Wave Anisotropy of Brittle Rocks," *J. Geophys. Res. B*, 100, 4149-4156, by Sayers, C. M. and Kachanov, M. (1995) may be considered.

As to the determination block 530 of the method 500, change in elastic stiffness of a reservoir may be computed using second-rank and fourth-rank fracture compliance tensors $\alpha_{ij}$ and $\beta_{ijkl}$. As an example, a change in elastic stiffness may be referred to as a second-rank hydraulic tensor (or hydraulic transmissivity tensor) $\gamma_{ij}$. As an example, a hydraulic tensor such as that described in "Continuum Model of Medium With Cracks," *J. Engng. Mech. Div. ASCE*, 106, 1039-1051, by Kachanov (1980) may be considered. For example, second-rank and fourth-rank fracture compliance tensors $\alpha_{ij}$ and $\beta_{ijkl}$ may be used to compute elastic and seismic properties and a hydraulic transmissivity tensor ($\gamma_{ij}$) may then be used to compute a permeability tensor ($k_{ij}$) of a fractured reservoir (e.g., a fractured geologic environment). As an example, variation in these tensors as a function of position in the reservoir may be used as a predictor of variation in fracture density and permeability of a fracture network and, for example, allow seismic data to be used as a constraint on the fluid flow properties of the reservoir.

As to the update block 534 of the method 500, a velocity model may be updated using a change in elastic stiffness, for example, per the determination block 530. An updated velocity model may be constrained/validated against elastic wave velocity measurements obtained using, for example, a seismic source and receiver in a well that is also used for hydraulic fracture treatment, seismic sources and receivers in different wells as in cross-well seismic acquisition, a sonic or image log acquired after the fracture treatment, or the largest error associated with the microseismic event.

As to the location block 538 of the method 500, as an example, locations of microseismic events may be re-determined (e.g., relocated) using an updated velocity model. For example, locations may become more accurate because they are based on an updated velocity that has taken into account velocity changes due to fractures induced by a hydraulic fracture treatment.

As to the determination block 546 of the method 500, a change in permeability in a reservoir (e.g., a geologic environment) may be computed using a final set of fractures and fracture apertures (e.g., using second-rank and fourth-rank fracture compliance tensors $\alpha_{ij}$ and $\beta_{ijkl}$ and change in elastic stiffness or second-rank hydraulic tensor $\gamma_{ij}$). A final set may be referred to herein as the set of tensors from a last iteration. As an example, a change in permeability may be constrained/validated against a flow test of the reservoir.

As an example, a method may include a validation process, for example, as part of a loop. As an example, from microseismic events, certain parameters defining fractures may be determinable more reliably than others. For example, orientation and size of fractures may be better constrained than apertures and compliances. As an example, a loop may estimate orientation, area, apertures and compliances based on microseismic events and other information, compute the change in elastic stiffnesses and seismic velocities, and then by minimizing the difference between the predicted and measured velocities optimize the estimates of fracture aperture and compliance. In such an example, measured velocities may include those velocities measured during or after hydraulic fracturing (e.g., using a time-lapse (4D) surface seismic, a borehole seismic, a crosswell seismic survey, etc.).

As an example, a gridded model of velocity may be obtained from data using tomography. In such an example, where before and after data are available (e.g., a surface seismic, a borehole seismic, a crosswell seismic survey, etc.) with respect to a hydraulic fracture stimulation (e.g., and optionally during), tomographic inversion may be applied to generate a gridded model of the velocity change due to the hydraulic fracture stimulation. A gridded model of velocity change may then be compared with a gridded model of a predicted velocity change and one or more parameters that may be poorly constrained by the microseismic events (e.g., such as fracture aperture or compliance) may be adjusted in an effort to achieve closer agreement with the measured velocity change.

As an example, consider a seismic survey technique that employs a seismic source (e.g., an air gun, a vibrator, an explosive, etc.) that emits energy to generate seismic waves. In such an example, generated seismic energy waves propagate into surrounding subterranean structure where some portion of the emitted energy may be directed to the surface (e.g., earth surface, sea floor, sea surface, or wellbore surface) as reflected seismic waves for receipt by seismic receivers (e.g., geophones, hydrophones, etc.). The receivers may record the received energy with respect to time in the form of traces or other data structures, which may be referred to as measured data, measurement data, etc.

As an example, measurement data, whether seismic measurement data, EM measurement data and/or other data, may be analyzed to develop a model of a subterranean structure. In such an example, the model may include, as examples, a velocity profile (in which velocities at different points in the subterranean structure are derived), a density profile, an electrical conductivity profile, etc.

As an example, to update a model used in seismic or EM tomography of a subterranean structure, a linearized forward problem may be solved using, for example, a least squares technique, such as by using a least squares quadratic relaxation (LSQR) solver.

As an example, to solve a linearized forward problem in subterranean tomography (e.g., travel time tomography or common-image-point (CIP) tomography), the following linearized forward problem formulation may be considered: $\Delta y = A\Delta x + n$, where $\Delta y$ and $\Delta x$ are data and model perturbations (data changes and model changes), respectively, and $n$ is the additive noise. In one exemplary implementation, A is a large sparse matrix obtained from the discretization of the Frechet derivatives of the non-linear operator which models the sensitivity of the picks to the velocity (and optionally to anisotropy parameters).

Preconditioned least squares is a common technique to solve the foregoing formulation where the model is first preconditioned by a preconditioner, for example, as follows $\Delta x = P\Delta x_p$, which may yield via substitution: $\Delta y = AP\Delta x_p + n$. In such an example, a solver can provide values for $\Delta x_p$ (e.g., consider a regularized LSQR solver that implements a least squares inversion technique to solve for changes in a model when additional information is considered).

As an example, a method may implement a tomographic technique (or tomographic techniques) to derive positions of microseismic events (e.g., initial positions, updated positions, etc.). For example, given data associated with microseismic events, a method may derive a location cloud for at least some of those microseismic events. Such a cloud may correspond to a hydraulic fracturing operation in a geologic environment where seismic events responsive to the hydraulic fracturing are spatially located (e.g., in part via a seismic velocity model).

As an example, a method may implement an explicit tomographic (e.g., flight-time) approach to validate a velocity model obtained via an updating process, for example, where input microseismic events were initially assigned positions in 3D space using the explicit tomographic approach. Such an example may be considered to "close a loop" (e.g., returning to previously implemented tomographic technique after an update process).

As an example, an initial velocity model may be obtained by tomographic inversion of surface seismic data in combination with constraints from well logs, borehole seismic, well tops, etc. acquired before a fracturing process is carried out. In such an example, following and/or during the fracturing process, new surface seismic, borehole seismic or crosswell seismic data may be acquired and used to develop a new gridded velocity model (e.g., by tomography or by one or more other techniques) where the new gridded velocity model may be compared with a predicted gridded velocity model and where one or more parameters may optionally be adjusted to obtain agreement (e.g., within some tolerance).

As an example, a velocity model may be obtained by inversion of measured travel time data from, for example, a surface seismic survey, a crosswell survey, etc. using seismic sources and receivers on the surface and/or in one or more boreholes. In such an example, to update the velocity model, the surface survey, crosswell survey, etc. may be repeated. As an example, a method may include repeating a survey to acquire data based on one or more conditions. For example, consider repeating a survey after a predetermined number of microseismic events had been acquired.

As to a time-lapse approach, the difference (or differences) between multiple surface seismic surveys, multiple crosswell surveys, etc. acquired at multiple different times may be considered. For example, a first survey may be acquired before performing a fracturing process while a second survey may be acquired after and/or during the fracturing process. Depending on the particular equipment, equipment configuration, size of surface, subsurface structure, etc., acquisition time for a seismic survey may be considerably longer than duration of a fracturing process (e.g., where surface sources are to be moved from place to place). However, as an example, a method may include performing a crosswell survey to acquire data at one or more times during a fracturing process (e.g., consider a multi-stage fracturing process). In such an example, while results may be related to a number of microseismic events at a time of acquisition, a method may include displaying results and/or data with respect to time (e.g., in an animated manner, with an appropriate time label, etc.). As an example, such a display may assist with understanding of geomechanics and time stamped data may optionally be used in conjunction with a dynamic geomechanical stress model or other model that may analyze, predict, etc. how a fracture grows in time in response to a fracturing process As to the blocks 522, 526 and 530 of the method 500, as an example, one or more of the techniques described in US Patent Application Publication No. 2011/0087472, which is incorporated herein by reference, may be implemented. For convenience, portions of the aforementioned publication are described below.

FIG. 9 shows an approximate perspective view of an example of a geologic environment 901 that includes a plane 906 associated with a volume 907, which may be a vertically fractured reservoir layer. Various angles are shown with respect to the plane 906, including angles θ and an angle φ, the angles defining the direction of an incident seismic wave. Also shown in FIG. 9 is an approximate plan view of an example of a volume V that includes various fractures r, for which, a normal vector may be defined $n^{(r)}$ as well as an area $A^{(r)}$.

In the perspective view of the geologic environment 901, reflection of a seismic compression wave, or P-wave, from the volume 907 is illustrated by the plane 906. The wave reflects in the plane 906 and includes an angle of incidence θ and an azimuth φ. For this illustration, the axes $x_1$, $x_2$ and $x_3$ are chosen such that the $x_3$ axis is normal to the volume 907. In the region of the reflection point, the fractured volume 907 may be treated as an effective medium with an elastic stiffness tensor ($c_{ijkl}$) and a compliance tensor ($s_{ijkl}$). These tensors tend to vary laterally over a reservoir due to a lateral variation in fracture density.

In the absence of fractures, the elastic stiffness tensor and elastic compliance tensor of a reservoir may be denoted by $c_{ijkl}^0$ and $s_{ijkl}^0$), respectively. The elastic compliance $s_{ijkl}$ of a fractured reservoir may be described as follows:

$$s_{ijkl} = s_{ijkl}^0 + \Delta s_{ijkl} \quad (8)$$

where the excess compliance ($\Delta s_{ijkl}$ in 8) due to the presence of the fractures may be expressed as follows:

$$\Delta s_{ijkl} = \frac{1}{4}(\delta_{ik}\alpha_{jl} + \delta_{il}\alpha_{jk} + \delta_{jk}\alpha_{il} + \delta_{jl}\alpha_{ik}) + \beta_{ijkl}. \quad (9)$$

The $\alpha_{ij}$ and $\beta_{ijkl}$ tensors may be defined as follows:

$$\alpha_{ij} = \frac{1}{V}\sum_r B_T^{(r)} n_i^{(r)} n_j^{(r)} A^{(r)}, \quad (10)$$

and $$\beta_{ijkl} = \frac{1}{V}\sum_r (B_N^{(r)} - B_T^{(r)}) n_i^{(r)} n_j^{(r)} n_k^{(r)} n_l^{(r)} A^{(r)}. \quad (11)$$

In (10) and (11), "$B_N^{(r)}$" and "$B_T^{(r)}$" represent the normal and shear compliances, respectively, of the $r^{th}$ fracture in a volume V; "$n_i^{(r)}$" represents the $r^{th}$ component of the normal to the fracture; and "$A^{(r)}$" represents the area of the fracture. The tangential compliance $B_T$ is assumed to be independent of the direction of the shear traction that occurs within the plane of the contact. It is noted from (10) and (11) that $\alpha_{ij}$ and $\beta_{ijkl}$ are symmetric with respect to all rearrangements of the indices so that, $\beta_{1122} = \beta_{1212}$, $\beta_{1133} = \beta_{1313}$, etc.

The elastic stiffness tensor of the fractured reservoir may be determined by inverting the compliance tensor given by (8). This allows the reflection coefficient to be computed for arbitrary fracture density and contrast across the interface using, for example, the method that is described in Schoenberg, M., and J. Protazio, Zoeppritz "Rationalized and Generalized to Anisotropy," *Journal of Seismic Exploration* 1, 125-144 (1992).

Another approach may be used to calculate the permeability tensor ($k_{ij}$) of a fractured reservoir given a discrete fracture network (DFN). More specifically, a second-rank hydraulic transmissivity tensor ($\gamma_{ij}$) may be defined as follows:

$$\gamma_{ij} = \frac{1}{V}\sum g^{(r)} n_i^{(r)} n_j^{(r)} A^{(r)}, \quad (12)$$

where "$g^{(r)}$" represents the hydraulic conductivity of the $r^{th}$ fracture in volume V and "$A^{(r)}$" represents the area of the fracture. As set forth in Kachanov, M., "Continuum Model of Medium with Cracks," *Journal of the Engineering Mechanics* Division of the American Society of Civil Engineers, 106, no. EMS5, 1039-1051 (1980), the permeability tensor in the presence of fractures may be written as follows:

$$k = k(\gamma). \quad (13)$$

Using "$k_0$" to denote the permeability tensor in the absence of fractures, the contribution of fractures to the permeability is given by $k - k_0$.

In absence of fractures, the permeability of a reservoir may be assumed to be isotropic, with a permeability tensor, as described below:

$$k = k_0 I, \quad (14)$$

where "I" represents the unit tensor, and "$k_0$" is an isotropic function. If both the gradient in pressure and the fractures undergo any orthogonal transformation, then the flow undergoes the same orthogonal transformation. The Cayley-Hamilton theorem then implies $k - k_0 I$ is a polynomial quadratic in $\gamma_{ij}$ with coefficients that are functions of the invariants of $\gamma_{ij}$. Linearizing in $\gamma_{ij}$ and using the fact that a set of parallel fractures does not affect the flow perpendicular to the fractures allows $k - k_0 I$ to be determined as a function of $\gamma_{ij}$, as described below:

$$k - k_0 I = C[tr(\gamma)I - \gamma]. \quad (15)$$

Described below, with reference to FIGS. 10 to 14, is a system and technique for determining the tensors $\alpha_{ij}$, $\beta_{ijkl}$ and $\gamma_{ij}$ from information that may be included in a DFN. The technique includes discretizing a region of interest of a hydrocarbon-bearing formation as a three-dimensional (3-D) Cartesian grid and efficiently determining the normal and area of each fracture in each cell, or cube, such that the $\alpha_{ij}$, $\beta_{ijkl}$ and $\gamma_{ij}$ tensors for each cube may be determined.

As an example, a cube may be further discretized by volumetric pixels, or voxels, and a standard voxel 1010 as shown in FIG. 10. The voxel 1010 may be defined by dimensions $\Delta x$, $\Delta y$ and $\Delta z$. For the example that is described below, a fracture polygon 1020 intersects the voxel 1010, and as depicted in FIG. 10, the polygon 1020 has an associated normal $\hat{n}_{x,y,z}$. The fracture polygon 1010 may be provided by the DFN. In such an approach, one may seek to efficiently determine a fracture area for the cube (i.e., the area of the polygon 1020 inside the cube), which may involve, for each voxel 1010 of the cube, which the polygon intersects, determining an area 1022 of the polygon 1020, which is partially or wholly inside the voxel 1010. By determining the fracture areas inside the voxels 1010, the fracture areas inside the cube may be determined, as further described below in connection with FIGS. 13 and 14.

It is noted that the solutions disclosed herein are for any arbitrary planar polygon 1020 that extends into 3-D space and is not limited to the specific six sided polygon that is depicted in FIG. 10.

For purposes of determining the area of the polygon 1020 inside the voxel 1010, the polygon 1020 is first conceptually surrounded by a minimum bounding rectangle 1080, which is depicted in the lower portion of FIG. 10. The minimum bounding rectangle of a convex polygon coincides with at least one polygon side, as illustrated in FIG. 10. The minimum bounding rectangle has a length of "L," which is the fracture length and a width of "W".

Figure 11:
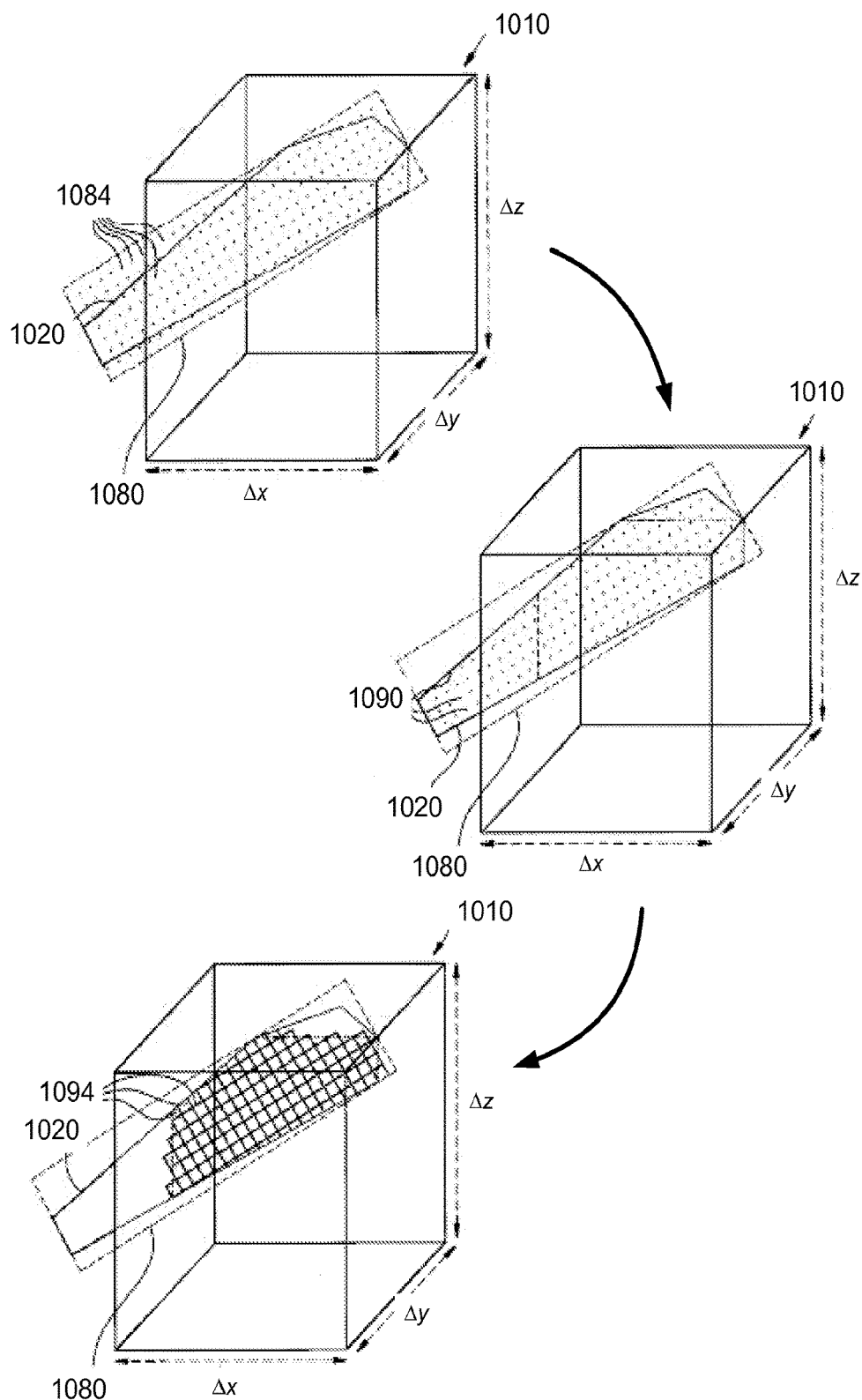

The minimum bounding rectangle 1080 is partitioned into a regular mesh of $n_L \times n_W$ points 1084, as depicted in FIG. 11. Thus, some of the points 1084 are located outside of the polygon 1020, some of the points 1084 are disposed inside the polygon 1020, some of the points are disposed inside the voxel 1010 and some of the points 1084 are disposed outside the voxel 1010 for this example.

For purposes of efficiently estimating the area of the polygon 1020 inside the voxel 1010, a goal may be to determine the points 1084, which are inside the polygon 1020 and inside the voxel 1010. To perform this determination, an algorithm, such as a winding algorithm, or winding number algorithm, may first be used to identify points 1090 inside the polygon 1020, as illustrated in FIG. 11. Next, the voxel indices of each mesh point 1090 may be determined, for example, for identifying points 1094 within the voxel 1010. Thus, the points 1094 are disposed both within the polygon 1020 and voxel 1010. The points 1094 therefore form a discretized area approximately representing the polygon's fracture area inside the voxel 1010. As the product of the length by the width of the minimum bounding rectangle 1080 increases, this discretized area approaches the actual fracture area inside the voxel 1010.

Figure 12:
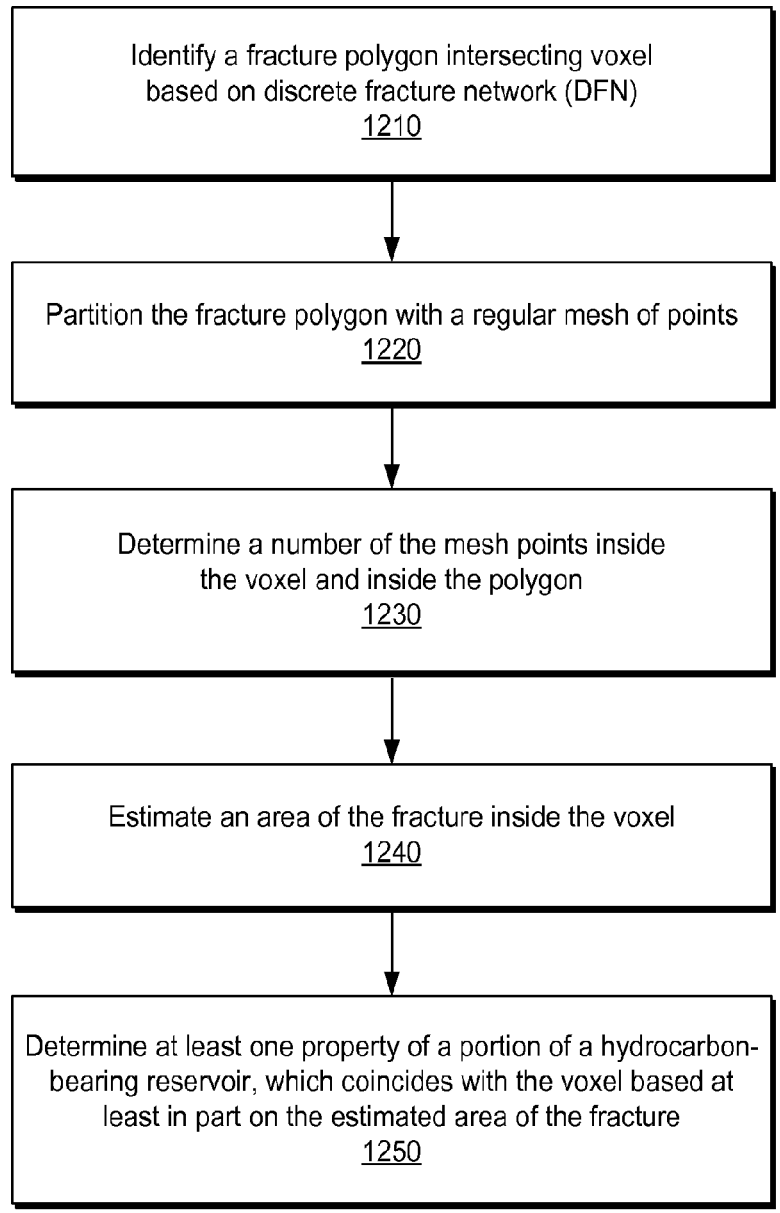
FIG. 12 illustrates an example of a method.

To summarize, a method 1200 is shown in FIG. 12, which may be employed in accordance with various implementations described herein for purposes of determining a fracture area inside a voxel. Pursuant to the method 1200, a fracture polygon that intersects a voxel of a 3-D grid of voxels is identified (block 1210) based on data, which are indicative a DFN. The polygon is then partitioned (block 1220) with a regular mesh of points and a determination is made (block 1230) regarding a number of the mesh points inside the voxel and inside the polygon. Based at least in part on the determined number of mesh points inside the voxel and inside the polygon, an area of the fracture inside the voxel is estimated, pursuant to block 1240. The technique 700 includes determining at least one property of a portion of a reservoir, which corresponds to the voxel based at least in part on the estimated area of the fracture, pursuant to block 1250.

Figure 13:
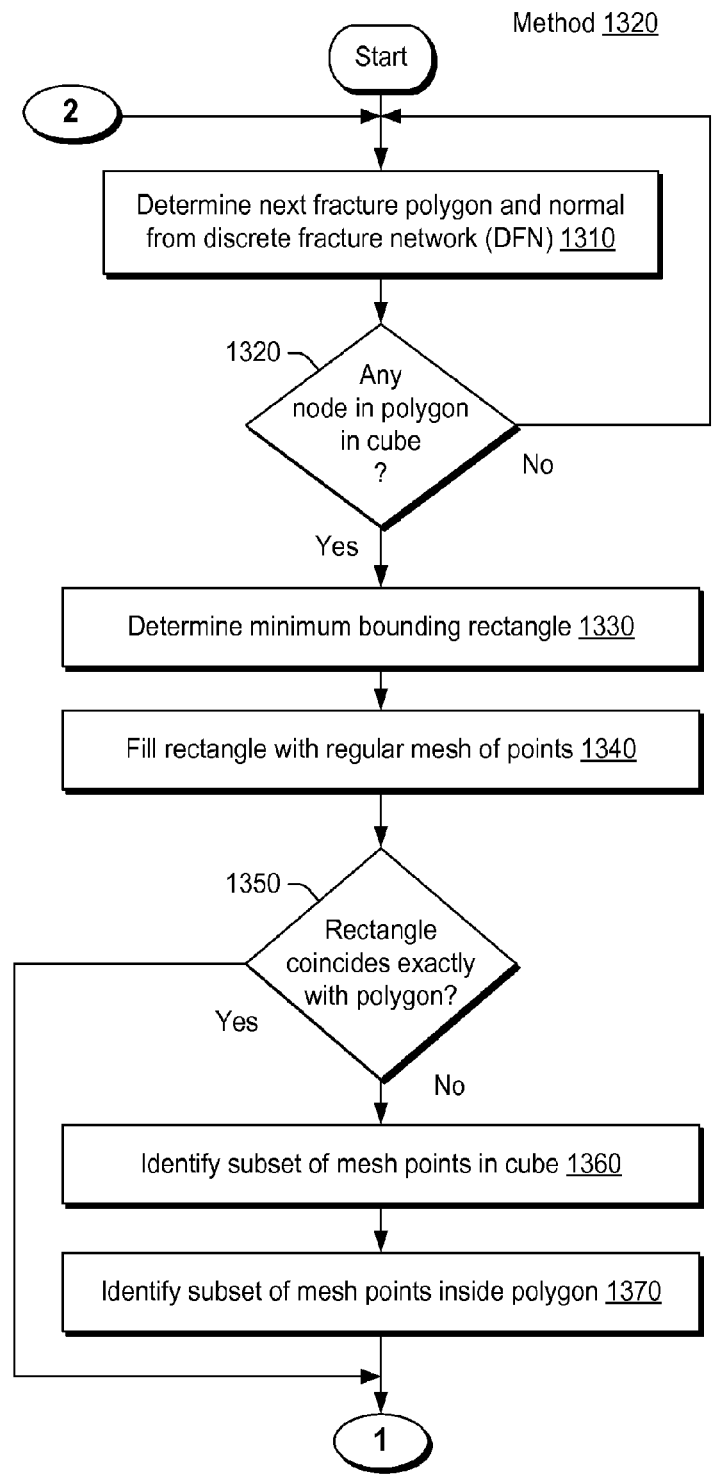
FIGS. 13 and 14 illustrate an example of a method.
Figure 14:
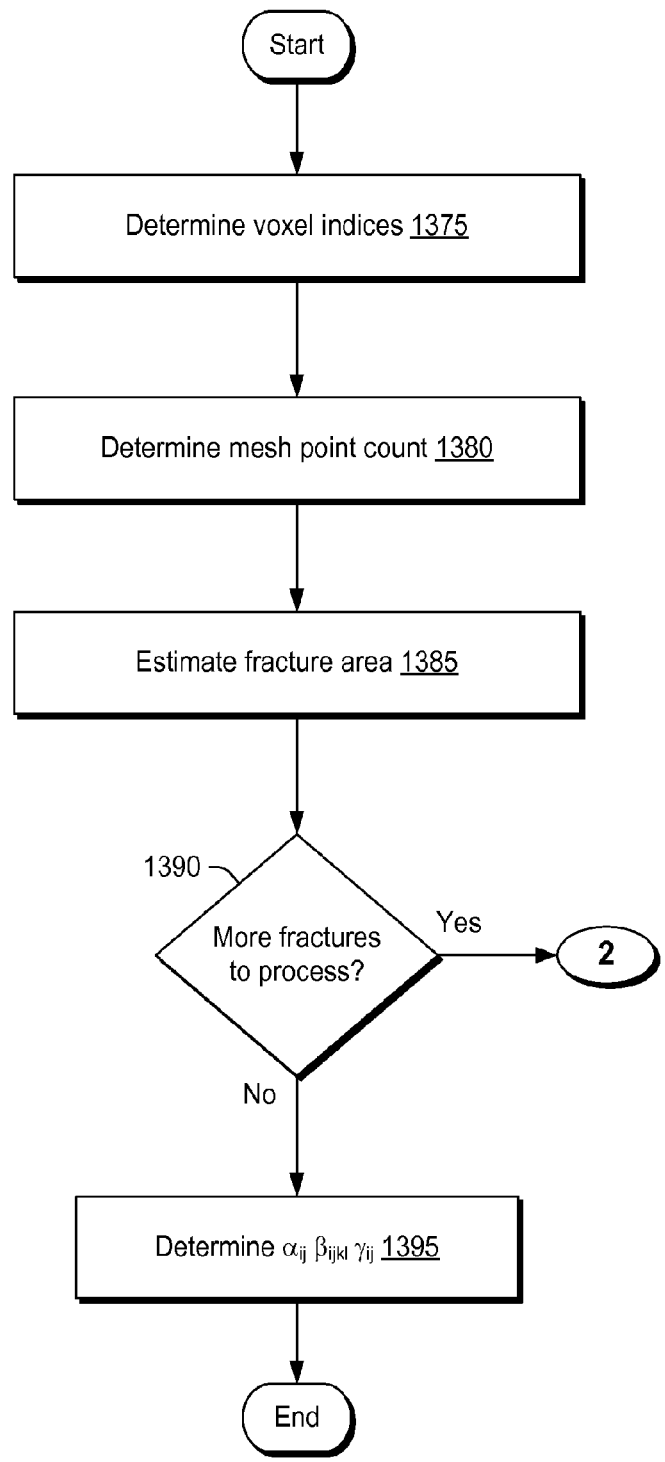

A cell, or cube, of voxels may be concurrently processed for purposes of determining the $\alpha_{ij}$, $\beta_{ijkl}$ and $\gamma_{ij}$ tensors for the cube. In this manner, FIGS. 13 and 14 depict an example of a method 1300 in accordance with various implementations described herein. Pursuant to the method 1300, the next fracture polygon to be processed and its normal are determined from the DFN, pursuant to block 1310. If a decision is made (block 1320) that the fracture polygon is entirely outside of the cube, then control returns to block 1310. Otherwise, a minimum bounding rectangle is determined, pursuant to block 1330. In this regard, a minimum bounding rectangle of length L and width W is fitted to the fracture polygon.

The bounding rectangle is then filled, pursuant to block 1340, with a regular fill mesh of $n_L \times n_W$ points. If a determination is made (block 1350) that the minimum bounding rectangle does not coincide exactly with the fracture polygon (i.e., the polygon 1020 is not a rectangle), then the subset of mesh points inside the polygon (block 1360) and the subset of mesh points in the cube (block 1370) are identified. Otherwise, control proceeds to block 1375 (FIG. 14), where the voxel indices are determined.

As an example, the voxel indices may be determined, pursuant to (16) to (18), which are set forth below:

$$i = INT\left[\frac{(Y - Y_o)\cos(-\theta) - (X - X_o)\sin(-\theta)}{\Delta Y}\right], \tag{16}$$

$$j = INT\left[\frac{(X - X_o)\cos(-\theta) + (Y - Y_o)\sin(-\theta)}{\Delta X}\right], \text{ and} \tag{17}$$

$$k = INT\left[\frac{(Z - Z_o)}{\Delta Z}\right], \tag{18}$$

where "$X_o$," "$Y_o$," and "$Z_o$" represent the coordinates of the cube origin; "X," "Y" and "Z" represent the coordinates of voxel [k,i,j]; "$\Delta X$," "$\Delta Y$" and "$\Delta Z$" represent the uniform grid increments and "$\theta$" represents the rotation angle of the X-Y axis.

After the voxel indices have been determined pursuant to block 1375, the method 1300 includes determining a mesh point count (block 1380), which represents the number of all of the mesh points that are inside the current fracture polygon and cube. Based on these points, the fracture area, which is the area of the currently-processed fracture inside the cube, may then be estimated, pursuant to block 1385. More specifically, the fracture area $A^{(r)}$ may be estimated as follows:

$$A^{(r)} = L \cdot W\left[\frac{N[k, i, j] - n_L - n_W + 1}{(n_L - 1)(n_W - 1)}\right]. \tag{19}$$

If any more fractures are to be processed, (block 1390), then control proceeds back to block 1310 to select another fracture polygon and normal (FIG. 13). Otherwise, all of the $A^{(r)}$ areas have been determined and (16), (17) and (18) may be applied to the determine the $\alpha_{ij}$, $\beta_{ijkl}$ and $\gamma_{ij}$ tensors, as described above (block 1395).

As an example, a method may include determining permeability enhancement and elastic stiffness decrease caused by a hydraulic fracture in low permeability reservoir (e.g., such as a gas shale reservoir). As an example, a method may include recording microseismic events during a hydraulic fracture treatment and using recorded data to identify one or more fracture planes leading to the microseismic events.

As an example, constraints imposed on identification of distinct fracture planes may be one of types such as: i) geometric constraints pertaining to the temporal and/or spatial distribution of the microseismic event cloud, and ii) geologic constraints pertaining to the in situ stress environment in which the fractures form and propagate through the rock. As an example, geometric constraints may include one or more of the following parameters:

maximum uncertainty in 3D micro-seismic event locations (dx,dy,dz)

minimum magnitude of individual microseismic events (m)

minimum confidence factor associated with individual microseismic events (c)

maximum time separation between temporally correlated microseismic events ($\delta t$)

maximum distance separation between spatially correlated microseismic events (ds)

maximum radius of microseismic event from centroid of microseismic cloud (r)

maximum perpendicular distance of microseismic event from a given fracture plane ($\delta$)

As an example, geologic constraints may include one or more of the followings:

minimum fracture plane dip ($\Phi$)
minimum primary fracture plane azimuth ($\theta_{min}$)
maximum primary fracture plane azimuth ($\theta_{max}$)
minimum orthogonal fracture plane azimuth ($\theta'_{min}$)
maximum orthogonal fracture plane azimuth ($\theta'_{max}$)
minimum horizontal stress ($\sigma h$)
maximum horizontal stress ($\sigma_H$)
azimuth of maximum horizontal stress ($\theta\sigma_H$)
type of focal mechanism associated with a microseismic event As an example, one or more actions of the method 500 (e.g., per one or more of the blocks) may be performed using a system. For example, a block may be a module storable in memory that includes instructions executable by a processor of a computing device, computing system, etc. As an example, a method or a portion thereof may be provided as an add-on or plug-in, for example, that operates according to specifications of a framework environment. For example, a commercially available framework environment marketed as the OCEAN® framework environment (Schlumberger Limited, Houston, Tex.) allows for seamless integration of add-ons (or plug-ins) into a PETREL® framework workflow. The OCEAN® framework environment leverages .NET® tools (Microsoft Corporation, Redmond, Wash.) and offers stable, user-friendly interfaces for efficient development. In an example embodiment, various modules may be implemented as add-ons (or plug-ins) that conform to and operate according to specifications of a framework environment (e.g., according to application programming interface (API) specifications, etc.).

FIG. 15 shows an example of a system 1501 that includes one or more computers 1502, one or more storage devices 1505, one or more networks 1506 and one or more modules 1507. As to the one or more computers 1502, each computer may include one or more processors (e.g., or processing cores) 1503 and memory 1504 for storing instructions (e.g., modules), for example, executable by at least one of the one or more processors. As an example, a computer may include one or more network interfaces (e.g., wired or wireless), one or more graphics cards, a display interface (e.g., wired or wireless), etc. As an example, data may be provided in the storage device(s) 1505 where the computer(s) 1502 may access the data via the network(s) 1506 and process the data via the module(s) 1507, for example, as stored in the memory 1504 and executed by the processor(s) 1503.

FIG. 15 also shows an example of a geologic environment 1550, for example, where the system 1501 may includes various features to manage various aspects of the geologic environment 1550 (e.g., an environment that includes a sedimentary basin). For example, the one or more of the modules 1507 may allow for direct or indirect management of sensing, drilling, injecting, extracting, etc., with respect to the geologic environment 1550. In turn, further information about the geologic environment 1550 may become available as feedback (e.g., optionally as input to one or more of the modules 1507).

In the example of FIG. 15, the geologic environment 1550 may be outfitted with any of a variety of sensors, detectors, actuators, etc. For example, equipment 1552 may include communication circuitry to receive and to transmit information with respect to one or more networks 1555. Such information may include information associated with downhole equipment 1554, which may be equipment to acquire information, to assist with resource recovery, etc. Other equipment 1556 may be located remote from a well site and include sensing, detecting, emitting or other circuitry. Such equipment may include storage and communication circuitry to store and to communicate data, instructions, etc.

FIG. 15 also shows equipment 1557 and 1558 associated with a well that includes a substantially horizontal portion that may intersect with one or more fractures 1559. As an example, the well may be drilled for a reservoir that is laterally extensive. In such an example, lateral variations in properties, stresses, etc. may exist where an assessment of such variations may assist with planning, operations, etc. to develop the reservoir (e.g., via fracturing, injecting, extracting, etc.). As an example, the equipment 1557 and/or 1558 may include components, a system, systems, etc. for fracturing, seismic sensing, analysis of seismic data, assessment of one or more fractures, etc.

As an example, one or more computer-readable media can include computer-executable instructions to instruct a computing system to: derive a cloud of microseismic events corresponding to a hydraulic fracturing operation in a geologic environment by spatially locating the microseismic events in the geologic environment via a seismic velocity model; extract a set of fracture planes from the microseismic cloud; assign characteristics to the fracture planes where the characteristics include aperture, normal compliance and shear compliance; determine a second-rank fracture compliance tensor and a fourth-rank fracture compliance tensor based on the characteristics of the fracture planes; determine a change in elastic stiffness of the geologic environment using the second-rank fracture compliance tensor and the fourth-rank compliance tensor; and determine permeability in the geologic environment based at least in part on fracture plane locations, orientations and apertures. Such an example may include computer-executable instructions to instruct a computer system to update the seismic velocity model based at least in part on the change in the elastic stiffness of the geologic environment; computer-executable instructions to instruct a computer system to spatially locate the microseismic events in the geologic environment via the updated seismic velocity model; computer-executable instructions to instruct a computer system to perform an operation on the geologic environment based at least in part on the updated seismic velocity model (e.g., a stimulation treatment operation, a well operation, a production operation, an injection operation, etc.).

As an example, a system can include one or more processors; memory; processor-executable instructions stored in the memory to derive a cloud of microseismic events corresponding to a hydraulic fracturing operation in a geologic environment by spatially locating the microseismic events in the geologic environment via a seismic velocity model; extract a set of fracture planes from the microseismic cloud; assign characteristics to the fracture planes where the characteristics include aperture, normal compliance and shear compliance; determine a second-rank fracture compliance tensor and a fourth-rank fracture compliance tensor based on the characteristics of the fracture planes; and determine permeability in the geologic environment based at least in part on fracture plane locations, orientations and apertures. As an example, such a system may include instructions to update the seismic velocity model based at least in part on the change in the elastic stiffness of the geologic environment and, for example, instructions to spatially locate the microseismic events in the geologic environment via the updated seismic velocity model.

As an example, a system may include processor-executable instructions stored in memory to perform an operation on the geologic environment (e.g., a stimulation treatment operation, a well operation, a production operation, an injection operation, etc.)

As an example, a system may include processor-executable instructions to perform an operation based at least in part on a member of a group consisting of an updated seismic velocity model, a change in elastic stiffness and a change in permeability.

As described herein, one or more computer-readable media may include computer-executable instructions to instruct a computing system to output information for controlling a process. For example, such instructions may provide for output to sensing process, an injection process, drilling process, an extraction process, etc.

FIG. 16 shows components of an example of a computing system 1600 and an example of a networked system 1610. The system 1600 includes one or more processors 1602, memory and/or storage components 1304, one or more input and/or output devices 1606 and a bus 1608. In an example embodiment, instructions may be stored in one or more computer-readable media (e.g., non-transitory memory/storage components 1604). Such instructions may be read by one or more processors (e.g., the processor(s) 1602) via a communication bus (e.g., the bus 1608), which may be wired or wireless. The one or more processors may execute such instructions to implement (wholly or in part) one or more attributes (e.g., as part of a method). A user may view output from and interact with a process via an I/O device (e.g., the device 1606). In an example embodiment, a computer-readable medium may be a storage component such as a physical memory storage device, for example, a chip, a chip on a package, a memory card, etc.

In an example embodiment, components may be distributed, such as in the network system 1610. The network system 1610 includes components 1622-1, 1622-2, 1622-3, . . . 1622-N. For example, the components 1622-1 may include the processor(s) 1602 while the component(s) 1622-3 may include memory accessible by the processor(s) 1602. Further, the component(s) 1602-2 may include an I/O device for display and optionally interaction with a method. The network may be or include the Internet, an intranet, a cellular network, a satellite network, etc.

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

The invention claimed is:

1. A method comprising:
    receiving microseismic data acquired via sensors as generated during a hydraulic fracturing operation in a geologic environment;
    based at least in part on the microseismic data, deriving a cloud of microseismic events corresponding to the hydraulic fracturing operation in the geologic environment by spatially locating the microseismic events in the geologic environment via a seismic velocity model;
    extracting a set of fracture planes from the cloud wherein the fracture planes correspond to at least one hydraulic fracture generated by the hydraulic fracturing operation;
    assigning characteristics to the fracture planes wherein the characteristics comprise aperture, normal compliance and shear compliance;
    determining a second-rank fracture compliance tensor and a fourth-rank fracture compliance tensor based on the characteristics of the fracture planes;
    determining a change in elastic stiffness of the geologic environment caused by the at least one hydraulic fracture using the second-rank fracture compliance tensor and the fourth-rank compliance tensor;
    updating the seismic velocity model based at least in part on the change in the elastic stiffness of the geologic environment caused by the at least one hydraulic fracture; and
    spatially locating the microseismic events in the geologic environment via the updated seismic velocity model to output updated microseismic event locations that locate the at least one hydraulic fracture in the geologic environment.

2. The method of claim 1 comprising comparing spatial locations of the microseismic events via the seismic velocity model to spatial locations of the microseismic events via the updated seismic velocity model.

3. The method of claim 2 comprising assessing the comparing with respect to one or more convergence criteria and, for an unfavorable assessment, repeating the extracting using the spatial locations of the microseismic events via the updated seismic velocity model.

4. The method of claim 2 comprising assessing the comparing with respect to one or more convergence criteria and, for a favorable assessment, determining permeability in the geologic environment based at least in part on fracture plane locations, orientations and apertures.

5. The method of claim 1 comprising determining permeability in the geologic environment based at least in part on fracture plane locations, orientations and apertures.

6. The method of claim 1 comprising determining permeability in the geologic environment based at least in part on fracture plane locations, orientations and apertures wherein at least the fracture plane locations are based at least in part on at least a portion of the updated microseismic event locations.

7. The method of claim 1 comprising performing an operation on the geologic environment based at least in part on the updated seismic velocity model.

8. The method of claim 7 wherein the operation comprises a member selected from a group consisting of a stimulation treatment operation, a well operation, a production operation and an injection operation.

9. One or more computer-readable media comprising computer-executable instructions to instruct a computing system to:
- receive microseismic data acquired via sensors as generated during a hydraulic fracturing operation in a geologic environment;
- derive a cloud of microseismic events corresponding to the hydraulic fracturing operation in the geologic environment by spatially locating the microseismic events in the geologic environment via a seismic velocity model;
- extract a set of fracture planes from the cloud wherein the fracture planes correspond to at least one hydraulic fracture generated by the hydraulic fracturing operation;
- assign characteristics to the fracture planes wherein the characteristics comprise aperture, normal compliance and shear compliance;
- determine a second-rank fracture compliance tensor and a fourth-rank fracture compliance tensor based on the characteristics of the fracture planes;
- determine a change in elastic stiffness of the geologic environment using the second-rank fracture compliance tensor and the fourth-rank compliance tensor; and
- determine permeability of the geologic environment, as stimulated by the hydraulic fracturing operation, based at least in part on fracture plane locations, orientations and apertures.

10. The one or more computer-readable media of claim 9 further comprising computer-executable instructions to instruct a computer system to update the seismic velocity model based at least in part on the change in the elastic stiffness of the geologic environment.

11. The one or more computer-readable media of claim 10 further comprising computer-executable instructions to instruct a computer system to spatially locate the microseismic events in the geologic environment via the updated seismic velocity model.

12. The one or more computer-readable media of claim 10 further comprising computer-executable instructions to instruct a computer system to perform an operation on the geologic environment based at least in part on the updated seismic velocity model.

13. The one or more computer-readable media of claim 12 wherein the operation comprises a member selected from a group consisting of a stimulation treatment operation, a well operation, a production operation and an injection operation.

14. A system comprising:
one or more processors;
memory;
processor-executable instructions stored in the memory to
- receive microseismic data acquired via sensors as generated during a hydraulic fracturing operation in a geologic environment;
- derive a cloud of microseismic events corresponding to the hydraulic fracturing operation in the geologic environment by spatially locating the microseismic events in the geologic environment via a seismic velocity model;
- extract a set of fracture planes from the cloud wherein the fracture planes correspond to at least one hydraulic fracture generated by the hydraulic fracturing operation;
- assign characteristics to the fracture planes wherein the characteristics comprise aperture, normal compliance and shear compliance;
- determine a second-rank fracture compliance tensor and a fourth-rank fracture compliance tensor based on the characteristics of the fracture planes; and
- determine permeability of the geologic environment, as stimulated by the hydraulic fracturing operation, based at least in part on fracture plane locations, orientations and apertures.

15. The system of claim 14 wherein the processor-executable instructions stored in the memory comprise instructions to update the seismic velocity model based at least in part on the change in the elastic stiffness of the geologic environment.

16. The system of claim 15 wherein the processor-executable instructions stored in the memory comprise instructions to spatially locate the microseismic events in the geologic environment via the updated seismic velocity model.

17. The system of claim 14 wherein the processor-executable instructions stored in the memory comprise instructions to perform an operation on the geologic environment.

18. The system of claim 17 wherein the operation comprises a member selected from a group consisting of a stimulation treatment operation, a well operation, a production operation and an injection operation.

19. The system of claim 17 wherein the processor-executable instructions perform the operation based at least in part on a member of a group consisting of an updated seismic velocity model, a change in elastic stiffness and a change in permeability.

\* \* \* \* \*